US009900845B2

United States Patent
Cui et al.

(10) Patent No.: US 9,900,845 B2
(45) Date of Patent: Feb. 20, 2018

(54) BATTERY SAVING WITH RADIO CONTROL BASED ON CELLULAR CONDITION DATA

(71) Applicants: AT&T INTELLECTUAL PROPERTY I, L.P., Atlanta, GA (US); AT&T Mobility II LLC, Atlanta, GA (US)

(72) Inventors: Zhi Cui, Sugar Hill, GA (US); Arthur Richard Brisebois, Cumming, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 149 days.

(21) Appl. No.: 14/494,487

(22) Filed: Sep. 23, 2014

(65) Prior Publication Data

US 2016/0088570 A1    Mar. 24, 2016

(51) Int. Cl.
*H04W 52/18*    (2009.01)
*H04W 52/02*    (2009.01)

(52) U.S. Cl.
CPC ....... *H04W 52/18* (2013.01); *H04W 52/0209* (2013.01); *Y02B 60/50* (2013.01)

(58) Field of Classification Search
CPC .............................. H04W 36/22; H04W 52/02
See application file for complete search history.

(56) References Cited

U.S. PATENT DOCUMENTS

| 5,317,683 A | 5/1994 | Hager et al. |
| 5,377,355 A | 12/1994 | Hager et al. |

(Continued)

FOREIGN PATENT DOCUMENTS

| CN | 102857997 A | 1/2013 |
| EP | 1601219 A2 | 11/2005 |

(Continued)

OTHER PUBLICATIONS

Watanabe, et al., "Radio Network Selection Scheme Notified by the Each Network's Real-time Performance in the Multilayered Communication Network," 2012 15th International Symposium on Wireless Personal Multimedia Communications (WPMC), pp. 169-171. Retrieved on Jun. 28, 2013, 3 pages.

(Continued)

*Primary Examiner* — Andrew Chriss
*Assistant Examiner* — Voster Preval
(74) *Attorney, Agent, or Firm* — Amin, Turocy & Watson, LLP

(57) ABSTRACT

Battery power of a dual radio (e.g., Wi-Fi and cellular radios) user equipment (UE) is conserved based on limiting simultaneous (or substantially simultaneous) usage of the radios based on user preference, cellular network condition, device speed, and/or network operator policies. In one aspect, the UE can receive, by employing a first radio (e.g., cellular radio), an adaptable signal strength criterion related to real-time network load conditions of a first radio access network (e.g., cellular network). Moreover, if the signal strength criterion is satisfied, the UE can switch on a second radio (e.g., Wi-Fi radio) to facilitate connection with a second radio network (e.g., Wi-Fi network). The signal strength criterion is updated such that second radios of UEs that are located closer to a cell edge of the first radio access network are switched on before switching on second radios of UE that are located closer to the serving access point.

20 Claims, 16 Drawing Sheets

(56) References Cited

U.S. PATENT DOCUMENTS

| | | | |
|---|---|---|---|
| 5,477,645 A | 12/1995 | Bauer | |
| 5,890,131 A | 3/1999 | Ebert et al. | |
| 6,785,681 B2 | 8/2004 | Keskar | |
| 7,530,021 B2 | 5/2009 | Cheng et al. | |
| 7,679,518 B1 | 3/2010 | Pabla et al. | |
| 7,929,964 B2 | 4/2011 | Arumi et al. | |
| 7,974,871 B2 | 7/2011 | Oral et al. | |
| 7,979,097 B2 | 7/2011 | Hussain | |
| 8,078,164 B2 | 12/2011 | Ganesan | |
| 8,095,175 B2 | 1/2012 | Todd et al. | |
| 8,130,718 B2 | 3/2012 | Shaheen | |
| 8,214,748 B2 | 7/2012 | Srikanth et al. | |
| 8,223,677 B2 | 7/2012 | Mccamon | |
| 8,271,025 B2 | 9/2012 | Brisebois et al. | |
| 8,275,377 B2 | 9/2012 | Nanda et al. | |
| 8,315,230 B2 | 11/2012 | Todd et al. | |
| 8,321,796 B2 | 11/2012 | Lyle et al. | |
| 8,358,975 B2 | 1/2013 | Bahl et al. | |
| 8,417,823 B2 | 4/2013 | Luna et al. | |
| 8,489,615 B2 | 7/2013 | Dhara et al. | |
| 8,493,931 B1 | 7/2013 | Nix | |
| 8,539,040 B2 | 9/2013 | Luna et al. | |
| 8,718,100 B2 | 5/2014 | Markley et al. | |
| 8,750,188 B2 | 6/2014 | Nicoara et al. | |
| 2001/0034738 A1 | 10/2001 | Cantwell et al. | |
| 2004/0268246 A1 | 12/2004 | Leban et al. | |
| 2005/0027800 A1 | 2/2005 | Erickson et al. | |
| 2005/0038687 A1 | 2/2005 | Galdes | |
| 2006/0046736 A1 | 3/2006 | Pering et al. | |
| 2006/0063560 A1 | 3/2006 | Herle | |
| 2006/0085449 A1 | 4/2006 | Sattler et al. | |
| 2006/0106872 A1 | 5/2006 | Leban et al. | |
| 2006/0224430 A1 | 10/2006 | Butt | |
| 2007/0288278 A1 | 12/2007 | Alexander et al. | |
| 2008/0040187 A1 | 2/2008 | Carraher et al. | |
| 2008/0065447 A1 | 3/2008 | Evanchik et al. | |
| 2008/0113692 A1 | 5/2008 | Zhao et al. | |
| 2008/0126300 A1 | 5/2008 | Boss et al. | |
| 2008/0177611 A1 | 7/2008 | Sommers et al. | |
| 2009/0124284 A1 | 5/2009 | Scherzer et al. | |
| 2010/0087188 A1 | 4/2010 | Griff et al. | |
| 2010/0214943 A1* | 8/2010 | Immendorf | H04W 24/00 370/252 |
| 2010/0318399 A1 | 12/2010 | Li et al. | |
| 2011/0022714 A1* | 1/2011 | Nobukiyo | H04J 11/0093 709/226 |
| 2011/0059737 A1 | 3/2011 | Brisebois | |
| 2011/0075557 A1 | 3/2011 | Chowdhury et al. | |
| 2011/0086611 A1 | 4/2011 | Klein et al. | |
| 2011/0191484 A1 | 8/2011 | Babbar et al. | |
| 2011/0191672 A1 | 8/2011 | Schodl et al. | |
| 2011/0213631 A1 | 9/2011 | Mislavsky | |
| 2011/0261698 A1 | 10/2011 | Zhao et al. | |
| 2011/0289433 A1 | 11/2011 | Whalin et al. | |
| 2011/0306386 A1 | 12/2011 | Centoza et al. | |
| 2012/0176998 A1 | 7/2012 | Muellner et al. | |
| 2012/0191500 A1 | 7/2012 | Byrnes et al. | |
| 2012/0252423 A1 | 10/2012 | Brisebois et al. | |
| 2012/0258674 A1 | 10/2012 | Livet et al. | |
| 2013/0006693 A1 | 1/2013 | Haynes et al. | |
| 2013/0006695 A1 | 1/2013 | Haustein et al. | |
| 2013/0029708 A1 | 1/2013 | Fox et al. | |
| 2013/0065562 A1 | 3/2013 | Singh | |
| 2013/0065585 A1 | 3/2013 | Pelletier et al. | |
| 2013/0100944 A1 | 4/2013 | Kwon et al. | |
| 2013/0111038 A1 | 5/2013 | Girard | |
| 2013/0117060 A1 | 5/2013 | Henriksen et al. | |
| 2013/0144672 A1 | 6/2013 | Chakra et al. | |
| 2013/0182625 A1 | 7/2013 | Kuehnel et al. | |
| 2013/0263020 A1 | 10/2013 | Heiferman et al. | |
| 2013/0290059 A1 | 10/2013 | Troiani | |
| 2013/0322401 A1 | 12/2013 | Visuri et al. | |
| 2013/0337814 A1 | 12/2013 | Wong et al. | |
| 2014/0045498 A1* | 2/2014 | Choi | H04W 36/32 455/436 |
| 2014/0078896 A1* | 3/2014 | Prytz | H04W 48/18 370/230 |
| 2014/0098796 A1 | 4/2014 | Xue et al. | |
| 2014/0105003 A1 | 4/2014 | Austin et al. | |
| 2014/0108085 A1 | 4/2014 | Henriksen | |
| 2014/0123032 A1 | 5/2014 | Lanz et al. | |
| 2014/0149166 A1 | 5/2014 | Henriksen et al. | |
| 2014/0164919 A1 | 6/2014 | Ikeda | |
| 2014/0200944 A1 | 7/2014 | Henriksen et al. | |
| 2014/0328190 A1* | 11/2014 | Lord | H04W 24/02 370/252 |
| 2015/0009963 A1* | 1/2015 | Yang | H04W 36/30 370/332 |
| 2015/0120440 A1 | 4/2015 | Jung et al. | |
| 2015/0149182 A1 | 5/2015 | Kalns et al. | |
| 2015/0271729 A1* | 9/2015 | Sirotkin | H04W 48/00 370/332 |
| 2015/0294220 A1 | 10/2015 | Oreif | |
| 2016/0037442 A1* | 2/2016 | Chen | H04W 52/0225 370/328 |

FOREIGN PATENT DOCUMENTS

| | | |
|---|---|---|
| EP | 1839456 A1 | 10/2007 |
| EP | 2355581 A1 | 8/2011 |
| EP | 2603046 | 6/2013 |
| EP | 2645783 A1 | 10/2013 |
| WO | 0116816 | 3/2001 |
| WO | 03041033 | 5/2003 |
| WO | 2012121757 | 9/2012 |
| WO | 2012149954 | 11/2012 |
| WO | 2013043869 A1 | 3/2013 |

OTHER PUBLICATIONS

Alkhawlani et al., "Intelligent Radio Network Selection for Next Generation Networks," 2010 The 7th International Conference on Informatics and Systems (INFOS), 2010. Retrieved on Jun. 28, 2013, 7 pages.

Luo, et al., "Optimal Channel Access for TCP Performance Improvement in Cognitive Radio Networks: A Cross-Layer Design Approach," IEEE Global Telecommunications Conference, 2009. Retrieved on Jun. 28, 2013, 6 pages.

Samdanis, et al., "Traffic Offload Enhancements for eUTRAN," IEEE Communications Surveys & Tutorials, vol. 14, No. 3, Third Quarter 2012, pp. 884-896. Retrieved on Jun. 28, 2013, 13 pages.

Sethi, Puneet. "Building (Network) Bridges: Small Cell and Wi-Fi Convergence." Aug. 28, 2012. Published online at [http://www.qca.qualcomm.com/thewire/building-network-bridges-small-cell-and-wifi-convergence/], retrieved on Jul. 24, 2014, 5 pages.

CISCO. "Architecture for Mobile Data Offload over Wi-Fi Access Networks." White Paper, 2012. Published online at [http://www.cisco.com/c/en/us/solutions/collateral/service-provider/serviceprovider-wi-fi/white_paper_c11-701018.html], retrieved on Jul. 24, 2014, 23 pages.

Dimatteo, et al. "Cellular traffic offloading through WiFi networks." Mobile Adhoc and Sensor Systems (MASS), 2011 IEEE 8th International Conference, IEEE, 2011. Published online at [http://hub.hku.hk/bitstream/10722/158754/1/Content.pdf?accept=1], retrieved on Jul. 24, 2014, 11 pages.

Bahl, et al. "Reconsidering wireless systems with multiple radios." ACM SIGCOMM Computer Communications Review vol. 34, No. 5: Oct. 2004. Published online at [http://research.microsoft.com/en-us/um/people/bahl/Papers/pdf/MultiRadio.pdf?0sr=ar], retrieved on Jul. 24, 2014, 8 pages.

Balasubramanian, et al. "Energy consumption in mobile phones: a measurement study and implications for network applications." Proceedings of the 9th ACM SIGCOMM conference on Internet measurement conference, ACM, 2009. Published online at [http://hph16.uwaterloo.ca/~bshihada/S13-344/papers/tailender-imc09.pdf] retrieved on Jul. 24, 2014, 14 pages.

Office Action dated Apr. 22, 2015 for U.S. Appl. No. 14/018,045, 33 pages.

(56) References Cited

OTHER PUBLICATIONS

Office Action dated Mar. 11, 2016 for U.S. Appl. No. 14/018,045, 27 pages.
Office Action dated Sep. 10, 2015 for U.S. Appl. No. 14/018,045, 25 pages.
International Search Report for PCT Application No. PCT/US2014/053562 dated Jan. 8, 2015, 10 pgs.
DEA. Room Scheduling Software. http://www.dea.com/Solutions/Software-Solutions/Room-Scheduling-Software.aspx?mi=1. Retrieved on Jul. 21, 2014. pp. 2.
"ETOUCHES. Event Management Software. https://www.etouches.com/ehome/etouches/videotour/.Retrieved on Jul. 20, 2014. pp. 2".
Event Pilot. Online Itinerary Planner. http://ativsoftware.com/eventpilot-conference-app-features/online-itinerary-planner/. Retrieved on Jul. 20, 2014 pp. 2.
Ganttig. Swiss Army Knife for Resource Planning, http://www.ganttic.com/. Retrieved on Jul. 21, 2014. pp. 3.
McGowan Iain. Automatic Analysis of Multimodal Group Actions in Meetings. IEEE Transactions on Pattern Analysis and Machine Intelligence. vol. 27, p. 305-317. Retrieved on Jul. 23, 2014.
Office Action for U.S. Appl. No. 14/498,606, dated Mar. 30, 2017, 25 pages.
Notice of Allowance dated Jun. 29, 2016 for U.S. Appl. No. 14/018,045, 16 pages.

\* cited by examiner

BATTERY SAVING WITH RADIO CONTROL BASED ON CELLULAR CONDITION DATA

TECHNICAL FIELD

The subject disclosure relates to wireless communications, e.g., to battery saving with radio control based on cellular condition data.

BACKGROUND

With an explosive growth in utilization of communication devices, mobile telecommunications carriers are seeing an exponential increase in network traffic. To meet the demands of higher traffic, conventional systems employ traffic steering mechanisms that offload mobile traffic from a cellular network to an overlapping Wi-Fi network. By using Wi-Fi networks, for example, in indoor locations, mobile telecommunications carriers can deliver a superior customer experience and cost effectively boost network performance for the end user. Typically, when both cellular and Wi-Fi radios of a user equipment (UE) are switched on, the battery of the UE is drained very quickly (as compared to the slower battery drain when only a single radio is turned on). One of the reasons for the fast battery drain is that the Wi-Fi modem actively and continuously scans available Wi-Fi networks and performs related processing. Typically, many users turn off Wi-Fi due to its significant battery drain. This can result in the Wi-Fi radio being under utilized, especially in scenarios wherein Wi-Fi is the most suitable radio for a particular subscriber need.

DETAILED DESCRIPTION

Figure 1:
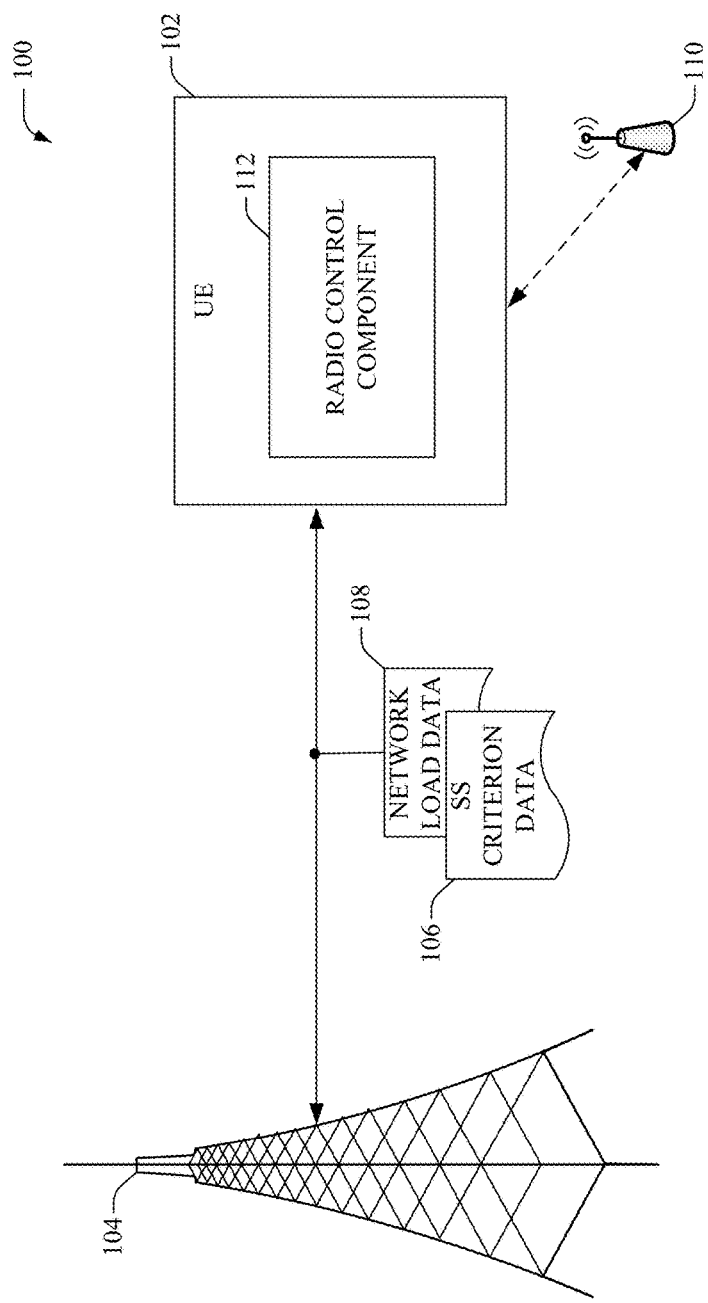
FIG. 1 illustrates an example system that facilitates radio control based on a signal strength (SS) criterion.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile terminal," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee®, or another IEEE 802.XX technology. Additionally, substantially all aspects of the disclosed subject matter can be exploited in legacy (e.g., wireline) telecommunication technologies.

Furthermore, the terms "user," "subscriber," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Access points can utilize various traffic steering mechanisms to offload mobile traffic from a cellular network to a Wi-Fi network, for example, network load condition-based traffic steering that can lead to optimal network utilization across various radio access technologies and/or improved user experience. As an example, the terms "traffic steering" as used herein can refer to directing, attempting to direct, and/or instructing to direct or deliver at least a port of traffic (data flows/packets) associated with a communication device from a first access point to a second access point. During traffic steering between different radio access technologies, typically, radios of a user equipment (UE) associated with the different radio access technologies are switched on, causing significant battery drain. The systems and methods disclosed herein increase power saving for the dual radio (e.g., Wi-Fi and cellular radios) UEs and optimize the Wi-Fi usage. In one aspect, UEs can automatically turn on/off Wi-Fi radios based on user preference, cellular network condition, and/or mobile operator policies. The battery power saving can also improve Wi-Fi usage when Wi-Fi becomes most suitable network for a user, since the battery drain becomes less of an issue for the users given the enhancement of service.

Referring initially to FIG. 1, there illustrated is an example system 100 that facilitates radio control based on a signal strength (SS) criterion, according to one or more aspects of the disclosed subject matter. System 100 can comprise a user equipment (UE) 102 that communicates with an access point 104 of a first radio network via a first radio (e.g., cellular radio). As an example, UE 102 can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UE 102 can also include, LTE-based devices, such as, but not limited to, most any home or commercial appliance that includes an LTE radio. It is noted that UE 102 can be mobile, have limited mobility and/or be stationary. In one example, UE 102 can include a multi-band, multi-mode, and/or multi-radio device. To conserve battery, during communication with the access point 104, the UE 102 can switch off other radios associated with different radio access technologies (e.g., wireless local area network (WLAN) radio, Wi-Fi radio, Bluetooth® radio, ZigBee® radio, etc.).

Usually, a cellular access network provides a better user experience than other radio access networks, such as, but not limited to Wi-Fi access networks. Thus, it is preferred that user traffic be transferred via the cellular access network. However, when the cellular access network is congested, at least some (not all) of the users' traffic can be offloaded to the other radio access networks. To improve user experience and cellular resource utilization, at least some of cell edge users' traffic can be initially moved to a different radio access network (if available). As the cell served by access point 104 gets congested/heavily loaded, UEs at (and/or closer to) the cell edge require more resources from the cellular network (when only the cellular radio is switched on) as compared to UEs closer to the access point 104. Thus, when traffic from the UEs at (and/or closer to) the cell edge is moved to another radio access network, a greater amount of resources of the cellular network are released and accordingly, cell congestion can be quickly and efficiently decreased.

In one embodiment, access point 104 (e.g., base station, eNodeB, femto access point, HomeNodeB, etc.) can determine network load information that represents mobile traffic handled by the access point 104. As an example, the network load information can represent a number of UEs served by the access point 104, load/bandwidth utilization of the UEs and/or load and/or bandwidth conditions associated with a transmission link that couples the access point 104 to the core cellular network (e.g., network gateway devices). In one aspect, the access point 104 can also determine a classification associated with network congestion based on the network load information. For example, the network congestion can be classified as "High," "Medium," "Low," etc. Additionally or alternatively, a percentage value (e.g., 90% congested, 75% congested, etc.) representing the network load can also be determined. Based on the network load information, the access point 104 can determine SS criterion data 106, such as, but not limited to a signal strength threshold (SST) value. In one aspect, the SS criterion data 106 can be modified to select specific UEs (e.g., UEs that are near a cell edge) and/or adjust the number of UEs that are steered to a target radio network (e.g., a Wi-Fi network). It is noted that the SST value corresponding to a specific network load and/or congestion classification can be static (e.g., constant value) or dynamic (e.g., changes based on network conditions). The access point 104 can transmit (e.g., periodically, on demand, in response to determining a change in the network load classification, etc.) the SS criterion data 106 to one or more UEs (including UE 102) that are served by the access point 104. Additionally or optionally, the access point 104 can transmit (e.g., periodically, on demand, in response to detecting an event, etc.) network load data 108 comprising the network load classification and/or percentage data to the one or more UEs (including UE 102). As an example, the access point 104 can transmit the SS criterion data 106 and/or network load data 108 via a set of cell broadcast messages (e.g., system information block message) via one or more layers (different radio access technologies (RATs) and/or frequencies).

The UE 102 can receive the SS criterion data 106 and/or network load data 108 and utilize the received information to determine whether the UE 102 should switch on a second radio associated with a disparate radio access technology (e.g., WLAN, Wi-Fi, Bluetooth®, ZigBee®, etc.) and connect to a target access point 110 of the disparate radio access network (RAN). Typically, the second radio can be kept switched off to conserve power and extend battery life of the UE 102. In one aspect, a radio control component 112 can determine whether a received signal strength associated with a signal transmitted by the access point 104 satisfies the SS criterion, network load satisfies a high load criterion, speed of the UE satisfies a low speed criterion, and/or operator or user defined policy has been satisfied. In response to one or more of the above criteria being satisfied, the radio control component 112 can switch on the second radio of the UE 102 and initiate a connection of the UE 102 with the target access point 110; else, the radio control component 112 can keep the second radio switched off, instruct the UE 102 to continue to be coupled to the access point 104, and direct data traffic via the access point 104. Although the radio control component 112 is depicted to reside within the UE 102, it is noted that, in one example, at least a portion of the radio control component 112 can reside outside the UE 102, for example, in a device locally or remotely coupled to the UE 102, within the access point 104, and/or a network device within the mobility network. In another example, the radio control component 112 can be distributed over multiple device (e.g., including UE 102) coupled to each other.

Figure 2:
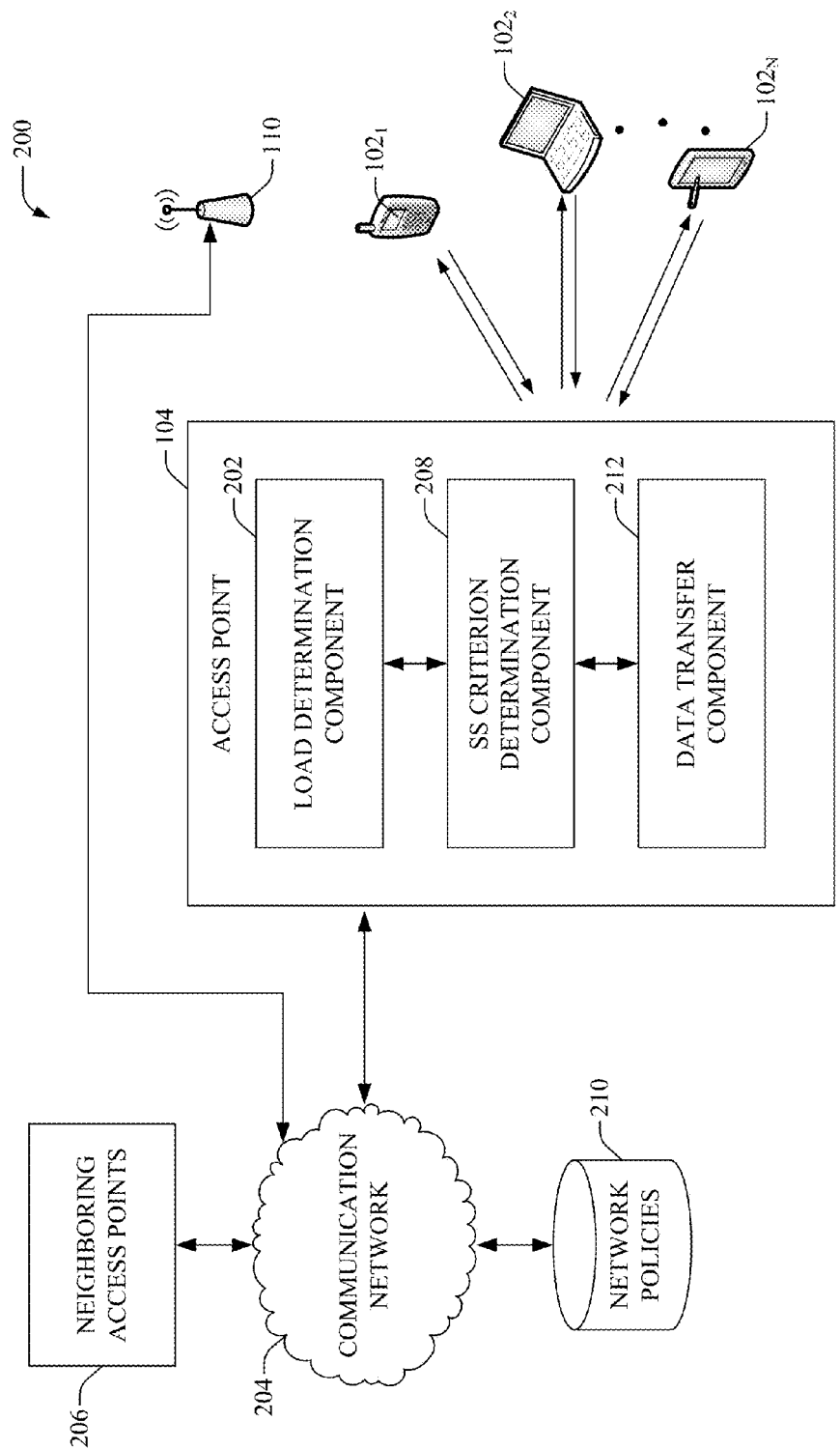
FIG. 2 illustrates an example system for determining a SS criterion that is employable for controlling radios of user equipment (UEs).

Referring now to FIG. 2, there illustrated is an example system 200 for determining a SS criterion that is employable for controlling radios of UEs, in accordance with an aspect of the subject disclosure. In one aspect, system 200 facilitates determination of a SST that can be utilized by UEs to switch on or off a radio (e.g., WLAN radio, Wi-Fi radio, Bluetooth® radio, ZigBee® radio, non-cellular radio, etc.). It is noted that the access point 104 and the target access point 110 can include functionality as more fully described herein, for example, as described above with regard to system 100. Further, the UEs $102_1$-$102_N$ (where N is a most any positive integer) can comprise most any communication devices that are communicatively coupled to the access point 104. Moreover, UEs $102_1$-$102_N$ can be substantially similar UE 102 and can include functionality as more fully described herein, for example, as described above with regard to UE 102. In one example, the target access point 110 can include, but is not limited to an access point that is operated and/or deployed by a service provider of the communication network 204, and that utilizes a different (or the same) radio technology for communication with the UEs $102_1$-$102_N$ as compared to the radio technology utilized by access point 104.

According to an embodiment, access point 104 can include a load determination component 202 that is utilized to determine current network load conditions associated with the access point 104. The load determination component 202 can determine load utilization on radio links (e.g., between access point 104 and UEs $102_1$-$102_N$) and/or a transport link (e.g., between access point 104 and the communication network 204). Additionally or optionally, the load determination component 202 can collect load information of neighboring access point (e.g., eNB, HNB, base stations, etc. deployed by the communication network 204), for example, via X2 interfaces enabled by Self Organizing Network (SON) and/or most any other transport mechanisms. In one example, the load determination component 202 can also receive load information of an overlapping cell from other RATs or frequencies. For example, the load determination component 202 can receive load information of the target access point 110 that can be utilized facilitate traffic steering. Based on the determined and/or received load information, the load determination component 202 can determine a classification and/or category associated with network congestion. For example, the load determination component 202 can classify the network load/congestion as High, Medium, Low, Normal, etc. Additionally or alternatively, the load determination component 202 can determine a percentage value (e.g., 90% congested, 75% congested, etc.) representing the network load.

Based on the network load information, a SS criterion determination component 208 can determine SS criterion data, such as, but not limited to a SST value (e.g., −108 dB, −105 dB, etc.) and/or range (e.g., −108 to −109 dB). As an example, as the network congestion increases, the SST value can be increased (and/or SS range can be increased), such that a greater number of UEs (e.g., UEs $102_1$-$102_N$) can be steered to a target radio network (e.g., WLAN, a Wi-Fi network, a femtocell network, Bluetooth® network, ZigBee® network, etc.) and the radios of UEs (e.g., UEs $102_1$-$102_N$) that facilitate communication with the target radio network can be turned on. Additionally or alternatively, the SST value or SS range data can be selected in a manner such that only the radios of UEs that are closer to a cell edge (e.g., further away from the access point 104) can be turned on (and the UEs can be steered to the target radio network) before turning on the radios of the UEs that are not close to the cell edge. In another example, the SST value or SS range data can be selected in a manner such that the radios of the UEs that are closer to target access point 110 can be turned on before turning on the radios the UEs that further away from the target access point 110. In one aspect, operator defined network policies 210 can be utilized to facilitate the determination of SS criterion. For example, the operator defined network policies 210 can specify the SST values and/or ranges corresponding to different network load conditions. In another aspect, the SS criterion determination component 208 can employ historical data (e.g., previously utilized SST values/ranges that improved radio network efficiency) and/or automated learning mechanisms (e.g., described in detail with respect to FIG. 8) to determine the SS criterion. Further, in yet another example, the SST values and/or ranges can be customized based on a type of target radio network (e.g., different SST values and/or ranges can be assigned for Wi-Fi networks, Bluetooth® networks, ZigBee® networks, etc.). It is noted that the mapping between the network load/congestion and the SST values can be static or dynamic. For example, the mapping can depend on target cell distribution and/or UE distribution within a coverage area of the access point 104 that can change over time.

To initiate the turning on (or off) of the radios of one or more of the UEs $102_1$-$102_N$ and/or facilitate traffic steering, a data transfer component 212 can transmit the information determined by the load determination component 202 and/or the SS criterion determination component 208 to the one or more UEs $102_1$-$102_N$. Moreover, the data transfer component 212 can transmit load information regarding (i) the access point 104; and optionally (ii) the neighboring access point 206; and/or (iii) overlapping cells from other RATs or frequencies (e.g., target access point 110). As an example, the load information can be in the format of categories (e.g., High, Medium, Low), or in the format of percentages (e.g., 70% congested, 90% congested, etc.). In addition, the data transfer component 212 can transmit the adaptive SS criterion to one or more of the UEs $102_1$-$102_N$. Additionally or optionally, the data transfer component 212 can transmit cell type information related to the target access point 110 (e.g., Wi-Fi cell, ZigBee® cell, WLAN cell, etc.).

Typically, the data transfer component 212 can transmit the load information and/or the SS criterion at various times, such as, but not limited to, periodically, on demand, based on detecting an event, based on detecting a change in a network load condition, etc. Further, the data transfer component 212 can transmit the load information and/or the SS criterion via one or more layers (e.g., different RATs and/or frequencies). As an example, the data transfer component 212 can transmit the load information and/or the SS criterion via one or more cell broadcast messages, such as, but not limited to, a System Information Block (SIB) messages. In one embodiment, the load information and/or the SS criterion can be included within or appended to an SIB message that contains other information. Alternatively, the load information and/or the SS criterion can be transmitted as a new SIB message. It is noted that the data transfer component 212 is not limited to broadcasting the load information and/or the SS criterion data, and that the data transfer component 212 can transmit the load information and/or the SS criterion data to one or more of the UEs $102_1$-$102_N$ via various different messages, such as, but not limited to a Short Message Service (SMS) message (e.g., SMS Cell Broadcast (SMS-CB) messages and/or SMS Peer-to-Peer (SMPP) messages), a Multimedia Messaging Service (MMS), an email message, a Wireless Application Protocol (WAP) push message, an Unstructured Supplementary Service Data (USSD), or any combination thereof. Further, the data transfer component 212 is not limited to transmitting the same messages to all the UEs $102_1$-$102_N$ and the data transfer component 212 can customize the messages for the UEs $102_1$-$102_N$ based on a subscriber class associated with the UEs $102_1$-$102_N$. For example, messages transmitted to UEs that are associated with a base rate plan can only include information related to a target access point (e.g., Wi-Fi access point), whereas, messages transmitted to UEs that are associated with a higher tier subscriber classes can include more comprehensive network load information (e.g., load information associated with different layers of LTE network).

Broadcast messages transmitted by the access point 502 can be received, read and/or followed the UEs $102_1$-$102_N$, when the UEs $102_1$-$102_N$ are operating in an idle mode (e.g., no ongoing communication sessions) and/or in a connected mode (e.g., performing an on-going communication session). In addition, in one example, when a UE, for example UE $102_1$, is in an active mode, the UE $102_1$ can facilitate load management by transmitting the query to the access point 104, for example, when determined that the UE $102_1$ is suffering the effects of congestion in-call (e.g., poor Quality of Service, dropped packets, interruptions, etc.). For example, if resources grants are getting sparse, the UE $102_1$ can transmit a query to the access point 104 to find a better cell while operating in the active mode (e.g., in-call). In one example, if the access point 104 is too overloaded to respond to the query, cached load information (e.g., from the last broadcast message) can be transmitted by the access point 104 to the UE $102_1$. The UE $102_1$ can utilize the information to turn on disparate radios and find a less loaded access point (e.g., target access point 110). In this example case, the UE can take a reception break (e.g., gap-assisted measurements) on the serving cell (e.g., served via access point 104) to find other candidates (e.g., target access point 110) with less load during the ongoing communication session.

Figure 3:
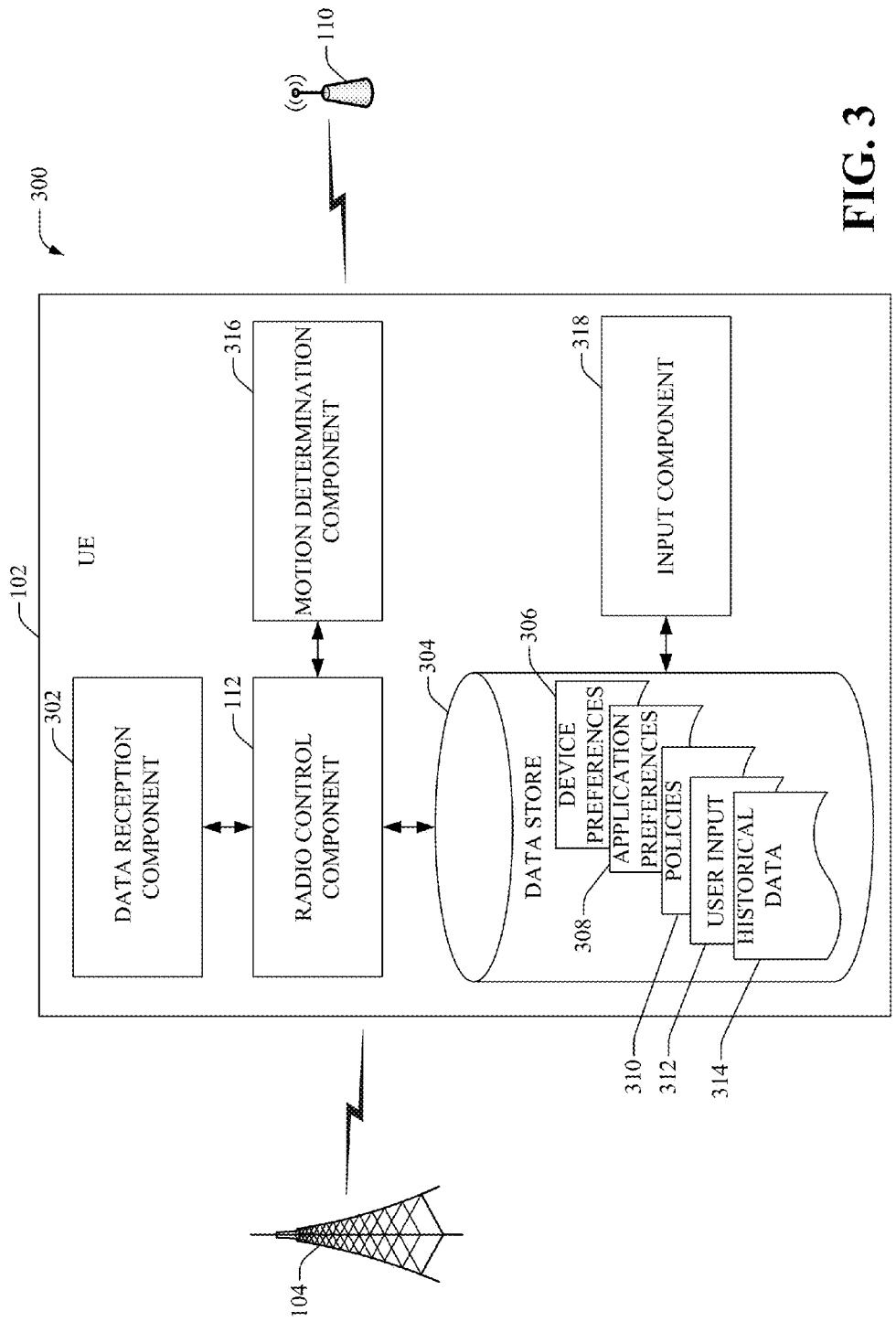
FIG. 3 illustrates an example system comprising a user equipment that facilitates efficient power management.

Referring now to FIG. 3, there illustrated is an example system 300 comprising a UE 102 that facilitates efficient power management, according to an aspect of the subject disclosure. The UE 102 can connect to different RANs (e.g., cellular network and WLAN) via different radios that employ different (or the same) RATs and/or frequencies. To conserve battery power, the UE 102 can typically keep only a single (e.g., cellular) radio on and switch on an additional radio (e.g., WLAN radio, Wi-Fi radio) only when certain criteria are met. It is noted that the UE 102, the access point 104, the target access point 110, and the radio control component 112 can include functionality as more fully described herein, for example, as described above with regard to systems 100 and 200.

In one aspect, a data reception component 302 can receive the load information and/or the SS criterion transmitted by the access point 104, for example, via a cell broadcast message. As an example, the data reception component 302 can parse the received messages and provide the load information and the SS criterion to the radio control component 112. According to an aspect, the radio control component 112 analyzes the load information and the SS criterion to determine whether a radio (e.g., WLAN radio, Wi-Fi radio) is to be turned on or off. If the load information indicates that the network load is low (e.g., below a defined load threshold), the radio control component 112 can turn off (or continue to keep turned off) the radio associated with the target RAN and can instruct the UE 102 to continue communicating via the access point 104. Alternatively, if the network load is high (e.g., above the defined load threshold), the radio control component 112 can utilize the SS criterion to determine whether the radio is to be turned on. In one aspect, the radio control component 112 can determine a received signal strength (e.g., reference signal received power (RSRP), received signal code power (RSCP), received signal strength indicator (RSSI), etc.) associated with a signal transmitted by the access point 104. Further, the radio control component 112 can determine whether the received signal strength satisfies the SS criterion. For example, the radio control component 112 can compare the received signal strength to the SST value and/or SS range. If the received signal strength is lower than the SST value (and/or within the SS range), the radio control component 112 can determine that the UE 102 can switch on a radio associated with the target RAN and accordingly, can initiate attachment signaling to connect to the target access point 110. Alternatively, if the received signal strength is higher than the SST value (and/or outside the SS range), the radio control component 112 can determine that the UE 102 can turn off (or continue to keep turned off) the radio associated with the target RAN and can instruct the UE 102 to continue communicating via the access point 104. Since the SST values and/or ranges are adapted based on current network conditions, a priority associated with UEs that are closer to the cell edge to have dual (or multiple) radios simultaneously (or substantially simultaneously) on is increased.

In addition to the load information and the SS criterion, the radio control component 112 can employ data stored within a local data store 304 (and/or a remote data store (not shown)) to further customize the radio control. It is noted that the data store 304 can include volatile memory(s) or nonvolatile memory(s), or can include both volatile and nonvolatile memory(s). Examples of suitable types of volatile and non-volatile memory are described below with reference to FIG. 16. The memory (e.g., data stores, databases) of the subject systems and methods is intended to comprise, without being limited to, these and any other suitable types of memory. In one aspect, the data stored within a local data store 304 can be received from a network device (not shown), for example via data reception component 302, and/or directly input via an input component 318 (e.g., keypad, touch screen, mouse, etc.) of the UE 102. Moreover, the radio control component 112 can analyze various parameters, such as, but not limited to, device preferences 306, application preferences 308, policies 310 (e.g., user defined policies, operator/service provider-defined policies, etc.), user input 312 (e.g., user has explicitly turned on or off the additional radio) and/or historical data 314 (e.g., device behavior, patterns, trends, etc.), to determine whether UE radios are to be turned on or turned off. For example, the radio control component 112 can determine, based on operator's policy and/or information gathered locally from the data store 304 and/or from the network that a specific application running on UE 102 would perform better if traffic associated with the application is switched to a Wi-Fi network and accordingly, can turn on the Wi-Fi radio. In another example, since certain applications (e.g., voice) may not be suited for Wi-Fi communications, steering data associated those applications to the Wi-Fi network is not preferred and accordingly, a second radio (e.g., Wi-Fi radio) can be switched (or continued to be kept) off. Further, the radio control component 112 can also utilize UE related data to facilitate radio control. In one aspect, a motion determination component 316 can be utilized to determine the UE related data, for example, location, speed, motion, position, and/or direction of travel of the UE 102 (e.g., based on GPS data, accelerometer and/or gyroscope data, etc.). As an example, steering a fast moving UE 102, or a UE at a specified location/area, to a WLAN is not preferred and accordingly, a second radio (e.g., WLAN radio, Wi-Fi radio) can be switched (or continued to be kept) off.

Further, the data reception component 302 can also receive, from the access point 104 and/or the target access point 110, information related to the target access point 110 such as (but not limited to) load conditions and/or cell type information. The radio control component 112 can utilize this data to facilitate radio management. For example, if determined that the target access point 110 is highly congested, the radio control component 112 can determine that the traffic of the UE 102 is not to be steered to the target RAN, and can instruct the UE 102 to switch off or continue to keep switched off) the target radio.

System 300 can encourage users to consider cost efficiency for their wireless use. For example, if unlimited data plans have expired (e.g., during a defined time period or after a usage threshold) and limited data plans (with overage charges) are being applied to data communications associated with the UE 302, the users can be encouraged to utilize (simultaneously or substantially simultaneously) dual radios of UE 302. Users are more apt to use additional UE radios (and sacrifice battery life and/or performance) if they are near and/or have exhausted their data plan usage limit. In this regard, a user can provide instructions (e.g., policies 310 and/or user input 312), via input component 318, to select an operation mode based on cost efficiency. For example, the operation mode can comprise: "default", "economy" and/or "performance" modes. When the "default" mode is selected, the radio control component 112 activates secondary radios (e.g., Wi-Fi radio) as already described above, for example, by comparing the actual SS to the load-adapted SST provided by the network. When SS is less than the SST (and/or other criterion like mobility state are met), the radio control component 112 can activate the secondary radio. When the "economy" mode is selected, the user is willing to sacrifice performance and battery life to conserve data plan usage. In this example scenario, the radio control component 112 can apply a positive offset (e.g., +6 dB) to the received SST and activate the secondary radio under a wider range of SS conditions (e.g., 6 dB sooner (higher SS) than the "default" setting). In other cases, the user may wish to preserve battery life and/or optimize performance consistency by using secondary radios only as a last resort. In this case, the user can select the "performance" mode and accordingly, the radio control component 112 can apply a negative offset (e.g., −6 dB) to the received SST and activate the secondary radio under a narrower range of SS conditions (e.g., 6 dB later (lower SS) than the "default" setting). In addition to these three manual modes, the radio control component 112 can track monthly usage against data plan limits and dynamically change modes according to the remaining data plan budget. For example, the radio control component 112 can change to economy mode when the monthly data use nears 90% (e.g., or most any defined usage threshold) of the monthly data plan limit According to an aspect, the radio control component 112 can perform radio management periodically, on-demand, in response to detecting an event (e.g., receipt of load information and/or the SS criterion). If an additional radio has been turned on, the UE 102 can scan and find a new network and initiate attachment signaling to connect to the new network; else, the UE 102 can continue to be connected to and communicate via the existing network. It is noted that the UE 102 is not limited to communicating all data (e.g., IP flows) through the new network and that the UE 102 can select a first portion of data (e.g., select a first set of IP flows) that can be communicated via the new network (e.g., via target access point 110) and a second portion of data (e.g., select a second set of IP flows) that can be communicated via the old network (e.g., via access point 104). As an example, the selection of the data (e.g., IP flows) can be based on operator policy(ies), e.g. using an access network discovery and selection function (ANDSF). The operator policies can be received by the UE 102 from an ANDSF server (now shown) within (or coupled to) the mobility network and stored as policies 310. For example, the operator policies can include an Inter-system mobility policy (ISMP) and/or an Inter-system routing policy (ISRP). The ISMP specifies that only one radio access network can be active (e.g., accessed) at a given time (e.g., all the traffic associated with UE 102 is communicated either via access point 104 or via target access point 110). The ISRP specifies that the UE 102 can access more than one radio access network at a given time (e.g., some traffic can be communicated via the target access point 110 based on operator ISRP policy). As an example, the policy can specify (but is not limited to) when a serving cellular network becomes congested, if the UE 102 is selected (e.g., based on SS criterion and/or various parameter utilized by the radio control component 112) to be steered to the target radio access point device 110, only data associated with certain applications, or requiring certain bandwidth/Quality of Service, etc. (e.g., streaming video) can be steered to the target access point device 110, while other data associated with other applications, or requiring other bandwidth/Quality of Service, etc. (e.g., VoIP) can be communicated via the access point 104.

Figure 4B:
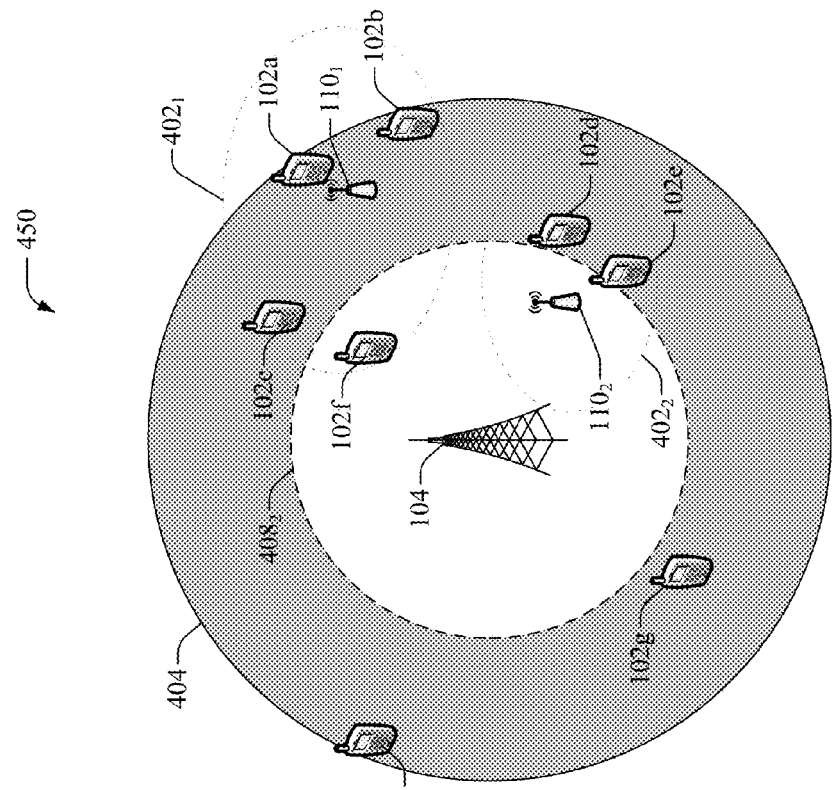
FIGS. 4A and 4B illustrate example systems that facilitate power management in multi-radio devices.
Figure 4A:
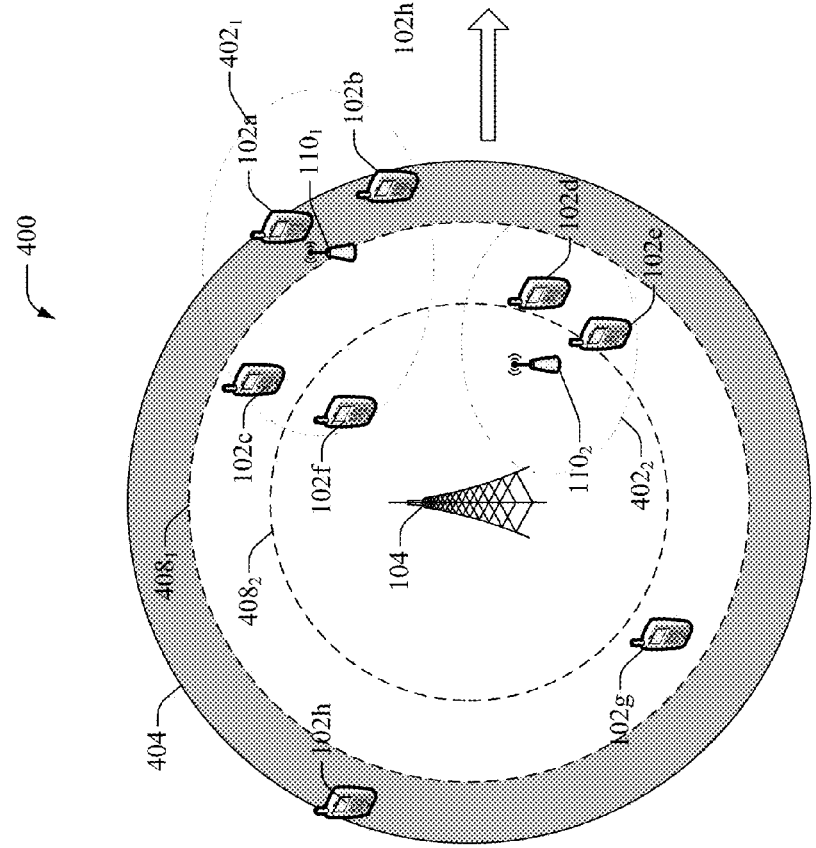

FIGS. 4A and 4B illustrate example systems (400, 450) that facilitate power management in multi-radio devices, according to an aspect of the disclosed subject matter. Systems 400, 450 depict traffic steering from a first network (e.g., a cellular network) to one or more second networks (e.g., WLAN), for example, that are commonly operated. Moreover, system 400 depicts traffic steering in a lightly congested cell, while system 450 depicts traffic steering in a more heavily congested cell. It is noted that the first and second network can use different or the same RATs, frequencies, and/or protocols for communication with the UEs. The access point 104 can include functionality as more fully described herein, for example, as described above with regard to systems 100-300. Further, the UEs 102a-102h can be substantially similar to UE 102 and can include functionality as more fully described herein, for example, as described above with regard to the UE 102. Although eight UEs 102a-102h are depicted in the coverage area 404, it can be appreciated that the subject disclosure is not limited to eight UEs and coverage area 404 can include one or more UEs. In addition, target access points $110_1$ and $110_2$ can be substantially similar to target access point 110 and can include functionality as more fully described herein, for example, as described above with regard to the target access point 110. Although only two target access points $110_1$ and $110_2$ are depicted to have coverage areas ($402_1$, $402_2$) that overlap (e.g., completely or partially) the coverage area of the access point 104, it can be appreciated that the subject disclosure is not limited to two target access points and can include one or more target access points.

When the first RAN (e.g., cellular RAN) is not congested, the network operator would typically prefer to serve its customers' traffic via the cellular network itself, for example, to provide cellular services and/or a better end customer experience. As the congestion level of first RAN increases (e.g., data traffic through access point 104 increases), the access point 104 can trigger activation of a second radio of some of the UEs 102a-102h within its coverage area such that the selected UEs can communicate via one or more target access points ($110_1$, $110_2$). FIG. 4A depicts an example scenario, wherein the first RAN is lightly congested, for example, with 70% load, congestion level set to "medium," etc. (e.g., determined by the load determination component 202). In this example, scenario, the access point 104 can determine (e.g., by employing SS criterion determination component 208) a first SST $408_1$ and transmit the first SST $408_1$ to one or more of the UEs102a-102h. For example, the SST $408_1$ can be set at −108 dB. Typically, the SST $408_1$ can be determined in a manner such that traffic associated with some of the UEs102a-102h (e.g., UEa and UEb), that experience poor signal quality (e.g., received signal strength is less than the SST $408_1$) and utilize a greater amount of resources of the first RAN can be steered from the first RAN to a second RAN of the target access point $110_1$. The remaining UEs (e.g., UEc-UEg) that experience better signal quality (e.g., received signal strength is greater than the SST $408_1$) and utilize fewer resources of the first RAN, and/or the UEs (e.g., UEh) that are not within a coverage area of another RAN can continue to be served by and communicate via the access point 104. Moreover, the SST value is modified such that traffic associated with UEs that are at (or close to) the cell edge, UEs that experience poor radio quality, and/or UEs that utilize maximum resources of the first RAN is steered to the target RAN before steering traffic associated with UEs that are at not as close the cell edge, UEs that experience better radio quality and/or UEs that utilize fewer resources of the first RAN. In order to facilitate the traffic steering, the selected UEs (e.g., UEa and UEb) can be triggered to activate an additional radio (e.g., WLAN radio, Wi-Fi radio, Bluetooth® radio, ZigBee® radio, etc.) associated with the target RAN. Further, to conserve battery, the other UEs (e.g., UEc-UEg) can be instructed to deactivate (or continue to keep deactivated) their additional radios.

It is noted that the UEa and UEb can consider additional criteria prior to activating the additional radio, such as (but not limited to), device preferences, UE motion, application preferences (e.g., determining that application and/or services running on the UE (e.g., UEa and UEb) are supported by the target access point $110_1$), policy data (e.g., data limits set by user/operator), user input, historical data, load/signal strength associated with the target access point $110_1$, etc. Once the additional radio has been activated, UEa and/or UEb can scan the target access point $110_1$ via a Hotspot2.0 (HS2.0) Beacon and/or Access Network Query Protocol (ANQP) to determine quality information associated with the target access point $110_1$.

Referring now to FIG. 4B, there depicted is an example scenario, wherein the first RAN is heavily congested, for example, with 88% load, congestion level set to "High," etc. (e.g., determined by the load determination component 202). In this example, scenario, the access point 104 determines (e.g., by employing SS criterion determination component 208) a second SST $408_2$ and transmits the second SST $408_2$ to one or more of the UEs 102a-102h. The second SST $408_2$ is typically higher than the first SST $408_1$. For example, based on the increase in network congestion, the access point can change the SST from −108 dB to −105 dB. Accordingly, traffic associated with greater number of UEs (UEa-UEe) can be steered to target radio access networks. The remaining UEs (e.g., UEf) that experience better signal quality (e.g., received signal strength is greater than the SST $408_2$) and/or the UEs (e.g., UEg-UEh) that are not within a coverage area of another RAN can continue to be served by and communicate via the access point 104. Moreover, UEa-UEe each utilize more resources of the first RAN as compared to UEf and accordingly, steering UEa-UEe to a second RAN can release more resources than those released if UEf was steered to the second RAN. In order to facilitate the traffic steering, the selected UEa-UEe can be triggered to activate an additional radio associated with the target RANs. Further, to conserve battery, the other UEs (e.g., UEf-UEg) can be instructed to deactivate (or continue to keep deactivated) their additional radios.

As discussed supra, it is noted that UEa-UEe can consider additional criteria prior to activating their additional radios such as (but not limited to) signal quality associated with a signal received from the target access points $110_1$ and $110_2$, the speed and/or motion criterion, application and/or services criterion, user preference criterion, and the like. Further, it is noted that as the congestion of the first RAN decreases, the SST value can be adjusted accordingly (e.g., the second SST $408_2$ can be changed back to the first SST $408_1$) and accordingly the activation/deactivation of the additional radios can be controlled.

Figure 5:
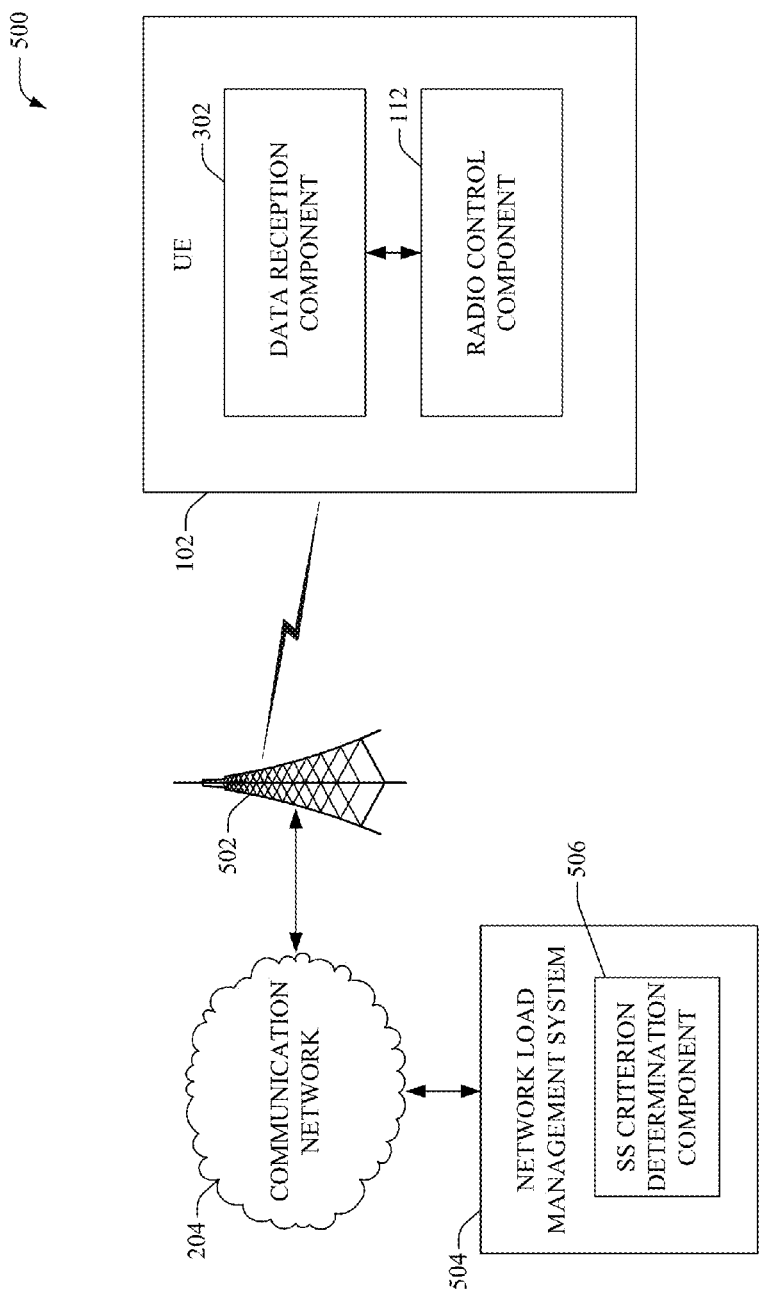
FIG. 5 illustrates an example system that facilitates query-based radio control.

Referring now to FIG. 5, there illustrated is an example system 500 that facilitates query-based radio control, according to one or more aspects of the disclosed subject matter. In one example, system 500 can be utilized in an example scenario wherein the access point 502 (e.g., base station, eNB, HNB, etc.) serving the UE 102 does not support determination and/or transmission of the SS criterion. In another example, system 500 can be utilized in an example scenario wherein the UE 102 performs load management in an active mode (e.g., during an ongoing communication session). In this example, the access point 502 may or may not support the determination and/or transmission of the SS criterion. It is noted that the UE 102, the radio control component 112, the communication network 204, and the data reception component 302 can include functionality as more fully described herein, for example, as described above with regard to systems 100-400. The UE 102 comprises a dual and/or multi-radio device that can typically switch off additional radios (radios in addition to the cellular radio) to conserve UE battery.

In one aspect, if the UE 102 determines that it is not served by a carrier/access point that transmits network load and/or SS criterion data, the data reception component 302 can query a network load management system 504 via the access point 502 to request for the network load and SS criterion data. As an example, the query can be transmitted periodically (e.g., based on predefined timing intervals), on-demand, in response to an event, etc. Typically, the query can be sent more or less frequently based upon the performance of the current served technology/carrier/layer. Further, the query can be sent when the UE 102 is operating in an idle mode (e.g., no ongoing communication sessions) or in an active mode (e.g., the UE is performing one or more ongoing communication sessions). Broadcast messages (if transmitted by the access point 502) can be received, read and/or followed the UE 102 when the UE 102 is in the idle mode and/or in a connected mode (e.g., performing an on-going communication session). In addition, in one example, the UE 102 can facilitate load management during an active mode by transmitting the query to the network load management system 504, for example, when determined that the UE 102 is suffering the effects of congestion in-call. For example, if the UE 102 determines during an ongoing communication session that resources grants are getting sparse, the UE 102 can transmit the query to the network load management system 504 to find a better (e.g., non-overloaded) cell (e.g., while still active in-call). In one example, if the network load management system 504 and/or the serving cell are too overloaded to respond to the query, cached load information can be transmitted to the UE 102, which in turn can utilize the cached load information to determine that the additional (different) radio is to be activated. In this example case, on activation of the additional radio, the UE 102 can communicate via the additional radio to search for target cells during an ongoing communication session, for example, by taking a reception break (e.g., gap-assisted measurements) on the serving cell.

In response to the query, the network load management system 504 can determine the load information and SS criterion data requested in the query and provide the requested information to the UE 102 in one or more response messages transmitted via the access point 502. In one aspect, the network load management system 504 can collect load data from one or more access points (e.g., access point 502) deployed in the communication network 204. For example, the one or more access points (e.g., access point 502) can report load data to the network load management system 504 (e.g., periodically, when a change is network load is detected, etc.). It is noted that the network load management system 504 can collect the load data in a pull configuration with the one or more access points (e.g., access point 502) and/or receive the load data pushed by one or more access points (e.g., access point 502). Based on an analysis of the collected data, the network load management system 504 can utilize SS criterion determination component 506 to identify SS criteria corresponding to different sectors/access points of the communication network 204. It is noted that SS criterion determination component 506 can be substantially similar to SS criterion determination component 208 and can include functionality as more fully described herein, for example, as described above with regard SS criterion determination component 208. In one aspect, the response sent by the network load management system 504 can be customized for the UE 102, for example, based on a subscriber class associated with the UE 102. In one example, data indicative of the subscriber class can be received from the UE 102 in the query and/or can be received from a subscriber data store (not shown) of the communication network 204. For example, if determined that the UE 102 is associated with a base rate plan, the network load management system 504 can transmit a response customized for the base rate plan that can only include information related to a target access point (e.g., Wi-Fi access point); whereas, if determined that UE 102 is associated with a higher tier, the network load management system 504 can transmit a response that comprises more comprehensive network load information (e.g., load information associated with different layers of LTE network). Although the network load management system 504 is illustrated as being remotely coupled to the access point 502, It is noted that the network load management system 504 can be locally coupled to the access point 502 (e.g., within the RAN) or can be located elsewhere within the communication network 204.

In an aspect, the query generated by UE 102 can include data such as (but not limited to) the served physical cell ID (PCI) of the access point 502 to which the UE 102 is connected, the cell identifier (ID) associated with the access point 502, the Basic Service Set IDentifier (BSSID) and/or the Service Set Identifier (SSID) (if the RAN includes or is otherwise capable of receiving load information from a nearby a Wi-Fi network). Based on the PCI/SSID/BSSID, the network load management system 504 can identify the network sectors corresponding to the access point 502 and/or one or more neighboring access points (not shown), dynamically determine (and/or lookup) the corresponding SS criterion and network load information, and transmit the determined information to the UE 102. The UE 102 can receive the SS criterion and network load information (e.g., via the data reception component 302) and analyze the SS criterion and network load information to activate/deactivate additional radios (e.g., via the radio control component 112).

Figure 6:
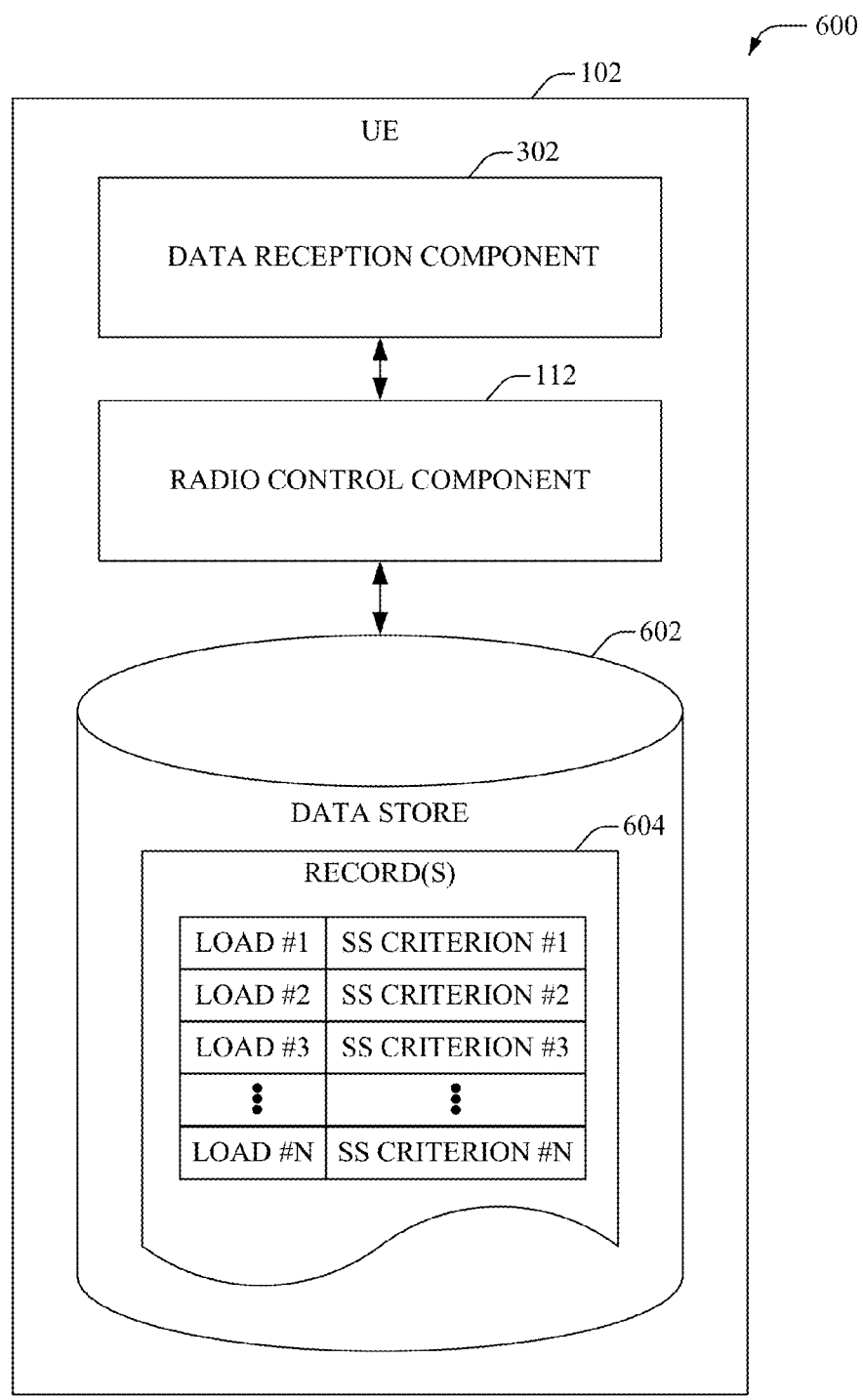
FIG. 6 illustrates an example system that facilitates radio control based on stored signal strength criteria.

Referring now to FIG. 6, there illustrated is an example system 600 that facilitates radio control based on stored SS criteria, in accordance with an aspect of the subject disclosure. It is noted that the UE 102, the radio control component 112, and the data reception component 302 can include functionality as more fully described herein, for example, as described above with regard to systems 100-500.

In one example, the UE 102 can include a data store 602 (the same as or different from data store 304) that can be utilized to store SS criteria records 604. In one aspect, the records 604 can retain SS criteria data corresponding to different network load classification values (e.g., "high," "low," "70%", "90%," etc.). For example, for a 70% load value, the corresponding SS criteria can include a SST value of −108 dB; and for an 88% load value, the corresponding SS criteria can include a SST value of −105 dB. In one example, the records 604 can be predefined by an operator, periodically (e.g., via over-the-air updates), during initialization, during power on, on-demand, etc. In another example, the records 604 can be populated by UE 102, based on the messages (e.g., SIB message, cell broadcast message, etc.) received from an access point (e.g., access point 104).

Once populated (or partially populated), the UE 102 can employ the records 604 to facilitate efficient radio control and network selection. In this example scenario, an access point serving the UE 102 can simply provide load information (and need not transmit SS criteria) to the UE 102. Based on the load information, the UE 102 can lookup the records 604 to determine a corresponding SS criterion. If the SS criterion is satisfied (e.g., RSPR/RSCP>SST), the UE 102 (e.g., by employing radio control component 112) can deactivate (or continue to keep in a deactivated state) an additional radio (e.g., WLAN radio, Wi-Fi radio, Bluetooth® radio, ZigBee® radio, etc.). Alternatively, if the SS criterion is not satisfied (e.g., RSPR/RSCP<SST), the UE 102 (e.g., by employing radio control component 112) can activate the additional radio and initiate attachment signaling to connect to another RAN via the additional radio.

Figure 7:
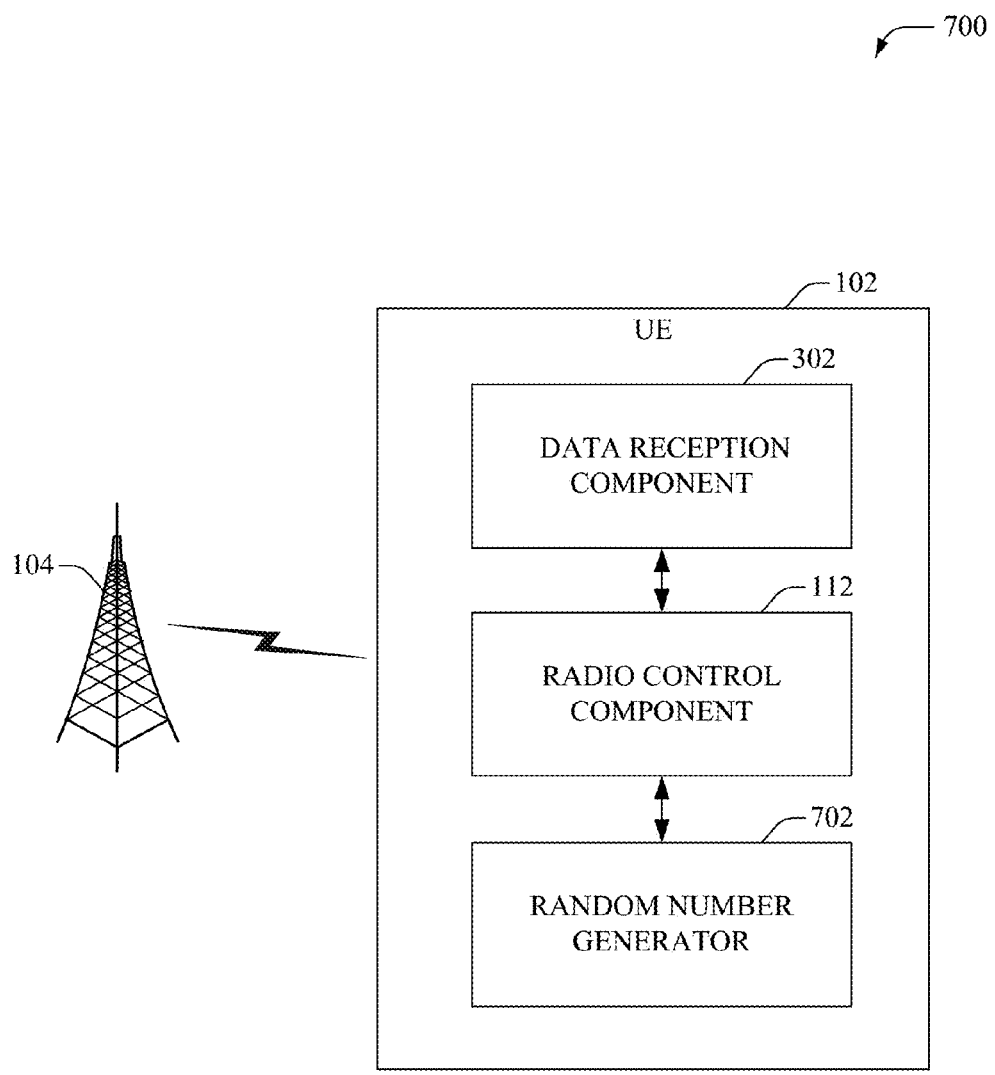
FIG. 7 illustrates an example system that controls operation of dual radios based on random number generation.

Referring now to FIG. 7, there illustrated is an example system 700 that controls operation of dual radios based on random number generation, in one aspect of the subject disclosure. It is noted that the UE 102, the access point 104, the radio control component 112, and the data reception component 302 can include functionality as more fully described herein, for example, as described above with regard to systems 100-600. Consider an example scenario, wherein network congestion of the first RAN is "High" and traffic associated with a large number of UEs, coupled to the first RAN, are steered to the second RAN. In this example scenario, the steering can cause congestion in the second RAN and the UEs can be handed back to the first RAN. This can lead to a ping-pong effect, wherein the UEs are handed over between the first RAN and the second RAN. To avoid this ping-pong effect, the access point 104 can transmit a calculated integer "A", e.g., in the range of 0-10, along with the load and SS criterion to only activate additional radios (e.g., WLAN radio, Wi-Fi radio, Bluetooth® radio, ZigBee® radio, etc.) of a portion of UEs and steer them to the second RAN. As an example, the calculated integer can be determined based on sequential counter and/or a random number generator. Further, each UE (e.g., UE 102) can generate a random number "X", e.g., which is also in the range of 0-10, for example by employing a random number generator 702. As an example, the random number generator 702 can generate the random number in accordance with a class of users with similar service characteristics. Further, based on a defined (e.g., operator-defined) policy that employs the generated random number "X" and the received integer "A", the radio control component 112 can determine whether the additional radio is to be switched on. For example, the radio control component 112 can compare the generated random number "X" to the received integer "A" and if determined that "X" is less than "A", the radio control component 112 can switch on the additional radio and initiate steering the UE 102 to the second RAN; otherwise the UE 102 can continue conserve battery and keep its additional radio switched off. Although depicted to reside within the UE 102, it can be appreciated that the random number generator can be locally or remotely coupled to the UE 102.

Figure 8:
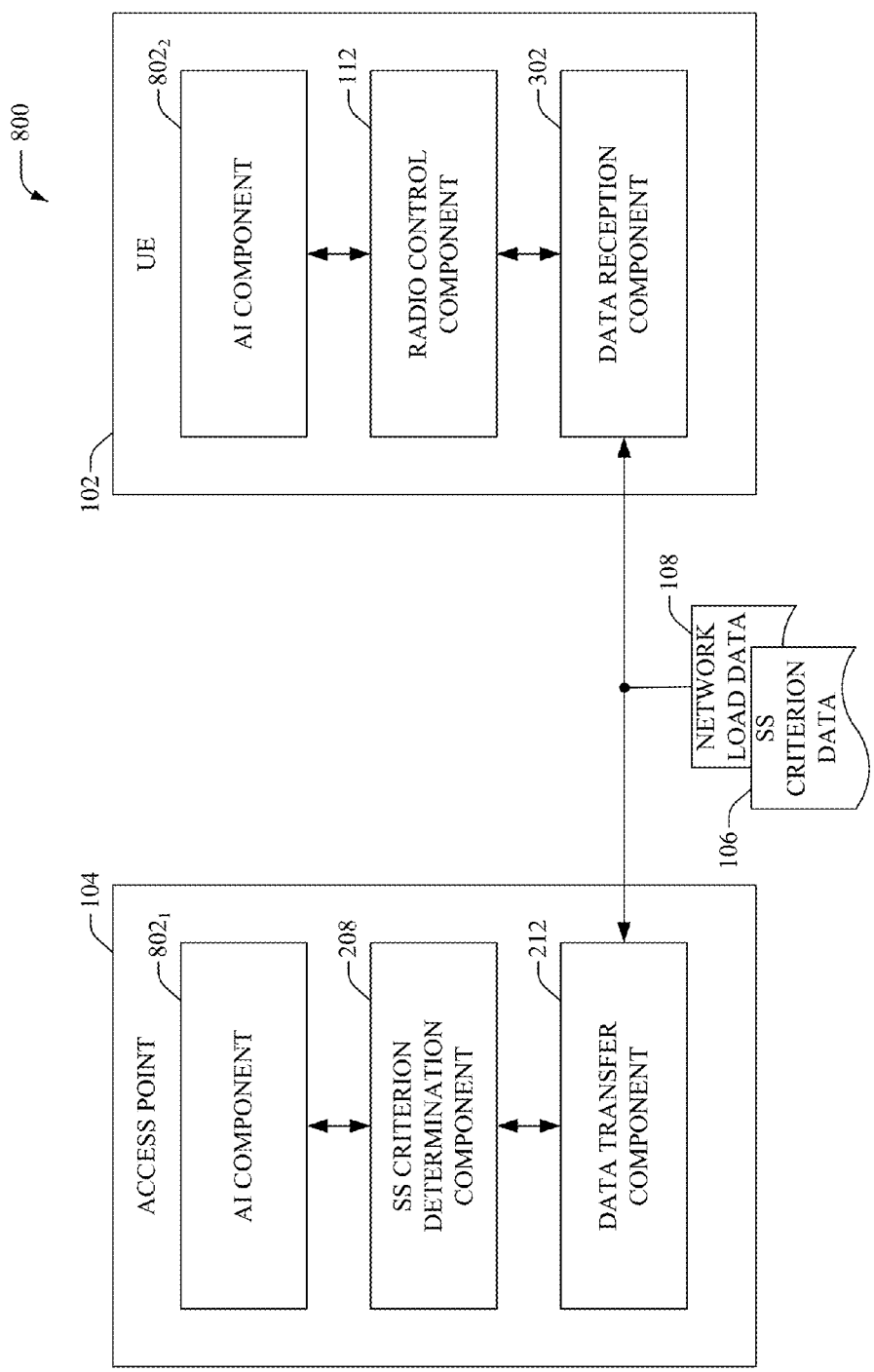
FIG. 8 illustrates an example system that facilitates automating one or more features in accordance with the subject embodiments.

Referring now to FIG. 8, there illustrated is an example system 800 that employs one ore more artificial intelligence (AI) components (802$_1$, 802$_2$), which facilitate automating one or more features in accordance with the subject embodiments. It can be appreciated that the UE 102, the access point 104, the SS criterion data 106, the network load data 108, the radio control component 112, the SS criterion determination component 208, the data transfer component 212, and the data reception component 302 can include respective functionality, as more fully described herein, for example, with regard to systems 100-700.

An example embodiment, system 800 (e.g., in connection with automatically determining a SS criterion, data transfer parameter, radio control criterion, operation mode, etc.) can employ various AI-based schemes for carrying out various aspects thereof. For example, a process for determining optimal SST values/ranges, an optimal time to transfer the SST values/ranges to a UE, determining a number of UEs that are to be steered to a target RAN to efficiently reduce network congestion without negatively impacting user experience, selecting the UEs to which the SST values/ranges are transferred, selecting an operation mode (e.g., default, economy and/or performance mode), etc. can be facilitated via an automatic classifier system implemented by AI component 802$_1$. Additionally or alternatively, a process for determining when an additional radio is to be switched on and off, which network is to be selected, when a query for load/SST data is to be transmitted, etc. can be facilitated via an automatic classifier system implemented by AI component 802$_2$.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from UEs and/or access points, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing UE behavior, user/operator preferences, historical information, receiving extrinsic information, network load/congestion trends, type of UE, type of target RAN, etc.). For example, SVMs can be configured via a learning or training phase within a classifier constructor and feature selection module. Thus, the classifier(s) of AI component 802$_1$ can be used to automatically learn and perform a number of functions, including but not limited to determining according to a predetermined criteria SST values/ranges related to a network load, when and/or or to which devices is the network load data 108 to be transmitted, when and/or or to which devices is the SS criterion data 106 to be transmitted, how many devices are to be steered to a target RAN, etc. Further, the classifier(s) of AI component 802$_2$ can be used to automatically learn and perform a number of functions, including but not limited to determining according to a predetermined criteria when the additional radio of UE 102 is to be turned off, when the additional radio of UE 102 is to be turned on, a network to which the UE 102 is to be handed over, a time at which a query for load/SST data is to be transmitted, etc. The criteria can include, but is not limited to, historical patterns and/or trends, UE behavior, user preferences, service provider preferences and/or policies, location of the UE, current time, type of UE, billing data, data plan usage data, type of target RAN (e.g., macro cell, femtocell, Wi-Fi network, etc.), and the like.

FIGS. 9-12 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 9:
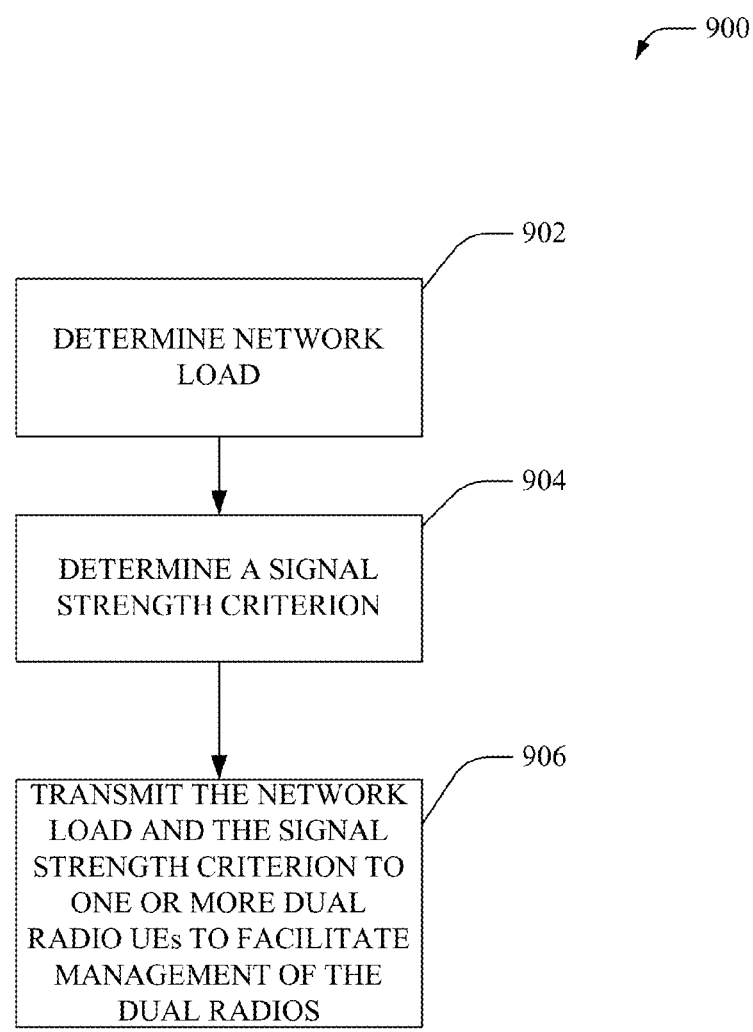
FIG. 9 illustrates an example method that transmits a SS criterion that is employed to facilitate dual radio management.

Referring now to FIG. 9, illustrated is an example method 900 that transmits a SS criterion that is employed to facilitate dual radio management, according to an aspect of the subject disclosure. As an example, method 900 can be implemented by one or more network devices of RAN, for example, an access point (e.g., base station, eNB, HNB, etc.) In another example, method 900 can be implemented by one or more devices of a core mobility network (e.g., network load management system).

At 902, network load associated with the access point and/or RAN can be determined. As an example, the network load can represent load utilization on radio links (e.g., between the access point and one or more UEs) and/or a transport link (e.g., between the access point and the core mobility network). Additionally or optionally, the network load can represent load utilization of neighboring access points, for example, received via X2 interfaces enabled by SON and/or most any other transport mechanisms. Further, the network load can also represent load utilization of an overlapping cell(s) from other RATs or frequencies (e.g., WLAN cell, Wi-Fi cell, etc.). In one example, the network load can be represented as a load level—High, Medium, Low, Normal, etc. In another example, the network load can be represented as a percentage value—90% congested, 75% congested, 30% congested etc.

At 904, a SS criterion can be determined, for example, that corresponds to the current network load. It is noted that the SS criterion can have a dynamic (or static) correspondence with the network load. For example, the correspondence can depend on overlapping cell distribution and/or UE distribution within a coverage area of the access point that can change with time. The SS criterion can define various parameters that facilitate activating dual radios associated with a set of UEs that enable steering the UEs to the overlapping cell such as, but not limited to a SST value or SS range. As an example, as the network load/congestion increases, the SST value can be increased (and/or SS range can be increased), such that a greater number of UEs can be steered to the overlapping cell(s). Additionally or alternatively, the SST value or SS range data can be selected in a manner such that UEs that are closer to a cell edge (e.g., further away from the access point) can be steered to the overlapping cell(s) before steering the UEs that are not close to the cell edge. Further, the SST values and/or ranges can be customized based on a type of the overlapping cell(s) (e.g., different SST values and/or ranges can be assigned for macro networks, femto networks, Wi-Fi networks, etc.).

At 906, the network load and the SS criterion can be transmitted to one or more UEs that are coupled to the access point, for example, via a cell broadcast message(s) (e.g., SIB message). Typically, the information can be transmitted periodically, on demand, based on detecting an event, based on detecting a change in a network load condition, etc. Further, the information can be transmitted via different RATs and/or radio frequencies. Moreover, the UEs can utilize the information to determine whether dual (or multiple) radios are to be activated or deactivated and accordingly manage battery power. If activated, the UEs can initiate a handover to (or simultaneous/additional connection with) the overlapping cell via the second radio (e.g., WLAN, radio, Wi-Fi radio, Bluetooth® radio, ZigBee® radio, etc.).

Figure 10:
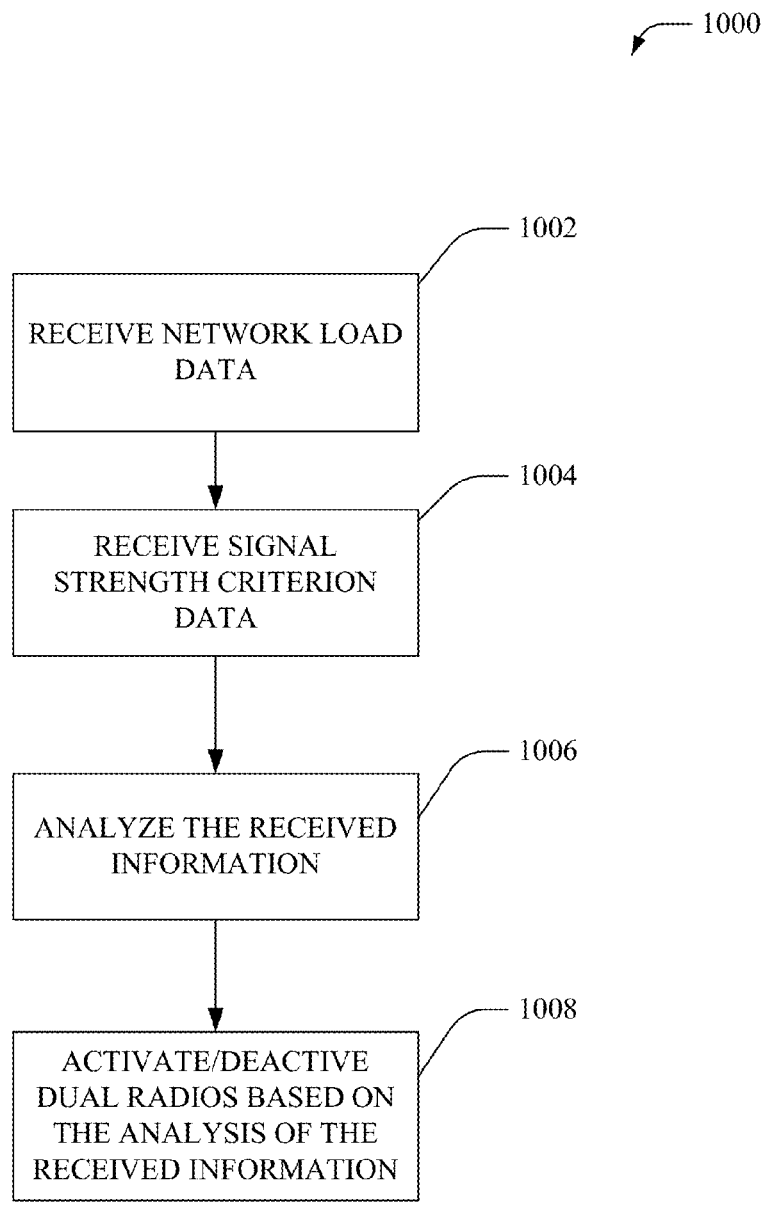
FIG. 10 illustrates an example method that automatically activates/deactivates dual radios of a UE.

FIG. 10 illustrates an example method 1000 that automatically activates/deactivates dual radios of a UE, according to an aspect of the subject disclosure. As an example, method 1000 can be implemented by a UE having dual or multiples radios. At 1002, network load data can be received, for example, from an access point of the first RAN. At 1004, a SS criterion can be received, for example, from the access point. As an example, the network load data and the SS criterion can be received in the same or different cell broadcast messages (e.g., SIB messages). In one aspect, the network load data and the SS criterion can be received via communication between the UE and the access point that is performed by employing a cellular radio. At 1006, the received information can be analyzed to determine whether a disparate radio, for example, associated with the second RAN is to be activated/deactivated. Further, at 1008, the dual radios (e.g., the cellular radio and the disparate radio) can be activated/deactivated based on the analysis of the received information. For example, it can be determined whether a received signal strength (e.g., RSRP, RSCP, RSSI, etc.) associated with the first RAN satisfies the SS criterion. If the received signal strength does not satisfy the SS criterion, the disparate radio can be activated; else, the disparate radio can be deactivated to conserve UE battery. Since the SS criterion is adapted to current network load conditions, the probability of the disparate radio being activated is higher if the UE is close to a cell edge of the first RAN. It is noted that various additional parameters such as (but not limited to) device preferences, application preferences, UE speed, user defined policies, operator/service provider-defined policies, etc. can be employed to facilitate the activation/deactivation.

Figure 11:
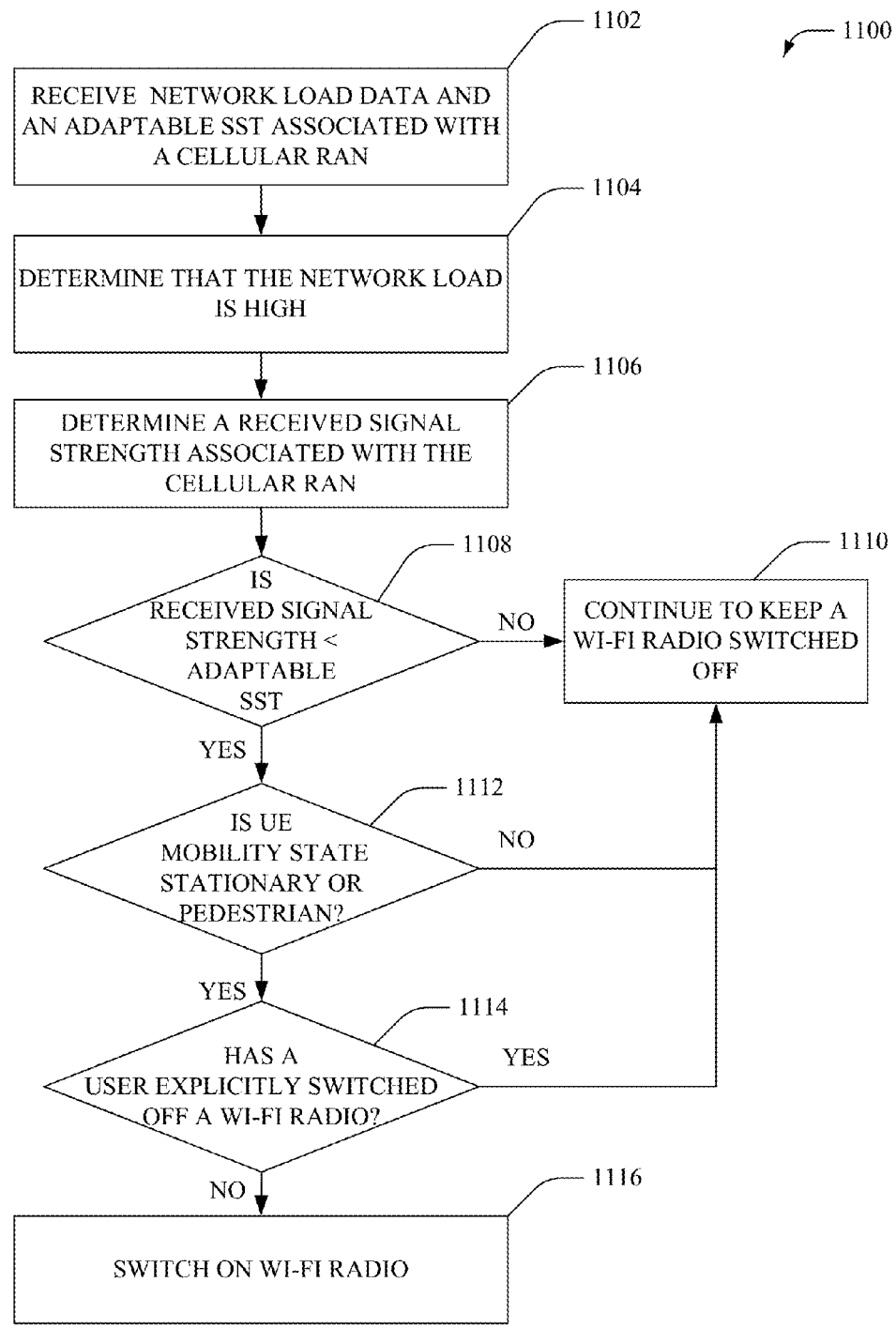
FIG. 11 illustrates an example method for determining whether a Wi-Fi radio of a UE is to be activated.

FIG. 11 illustrates an example method 1100 for determining whether a Wi-Fi radio of a UE is to be activated, according to an aspect of the subject disclosure. As an example, method 1100 can be implemented by a UE to limit the time that the Wi-Fi radio is kept switched on such that battery power of the UE is conserved. It is noted that although methodology 1100 refers of a Wi-Fi radio, the subject specification is not that limited and that a radio associated with most any communication technology/protocol can be utilized. At 1102, network load data and an adaptable SST associated with a cellular RAN can be received, for example, by employing a cellular radio. As an example, the SST is adapted based on real time-network load and can be received via one or more cell broadcast messages (e.g., SIB messages). At 1104, it can be determined that the network load is high. For example, the network load data can classify network congestion as "High," or a percentage value representing the network load can be determined to be greater than a defined load threshold.

At 1106, a received signal strength (e.g., RSRP, RSCP, RSSI, etc.) associated with the cellular RAN can be determined. Further, the received signal strength can be compared with the adaptable SST and, at 1108, it can be determined whether the received signal strength is less than the adaptable SST. If determined that the received signal strength is not less than the adaptable SST then, at 1110, a Wi-Fi radio of the UE is kept switched off (or is deactivated) to conserve UE battery. Further, if determined at 1108, that the received signal strength is less than the adaptable SST, then, at 1112, it can be determined whether the mobility state of the UE is stationary or pedestrian. For example, the speed/motion of the UE can be compared with a defined speed/motion threshold/criterion. If determined that the UE is fast moving or the mobility state is not stationary or pedestrian, then, at 1110, a Wi-Fi radio of the UE is kept switched off (or is deactivated) to conserve UE battery. Furthermore, if determined at 1108, that the mobility state of the UE is stationary or pedestrian, then, at 1114, it can be determined whether a user has explicitly switched off the Wi-Fi radio. If determined that the user has explicitly switched off the Wi-Fi radio at 1110, the Wi-Fi radio of the UE is kept switched off (or is deactivated) to conserve UE battery. Alternatively, if determined that the user has not explicitly switched off the Wi-Fi radio, then at 1116, the Wi-Fi radio can be switched on.

Subsequent to switching on the Wi-Fi radio, the UE can scan for and connect to a Wi-Fi network and traffic associated with the UE can be steered from the cellular RAN to the Wi-Fi RAN. It is noted that the UE is not limited to performing a handover (e.g., disconnecting from the cellular RAN) and can be simultaneously (or substantially simultaneously) be coupled to both the cellular and the Wi-Fi RAN. In this example scenario, the UE can determine, based on operator policy and/or application preferences, which data (e.g., a first set of IP flows) is to be communicated via the Wi-Fi RAN and which data (e.g., a second set of IP flows) is to be communicated via the cellular RAN. It is noted that various additional parameters such as (but not limited to) device preferences, application preferences, user defined policies, operator/service provider-defined policies, etc. can be employed to facilitate the switching on of the Wi-Fi radio.

Figure 12:
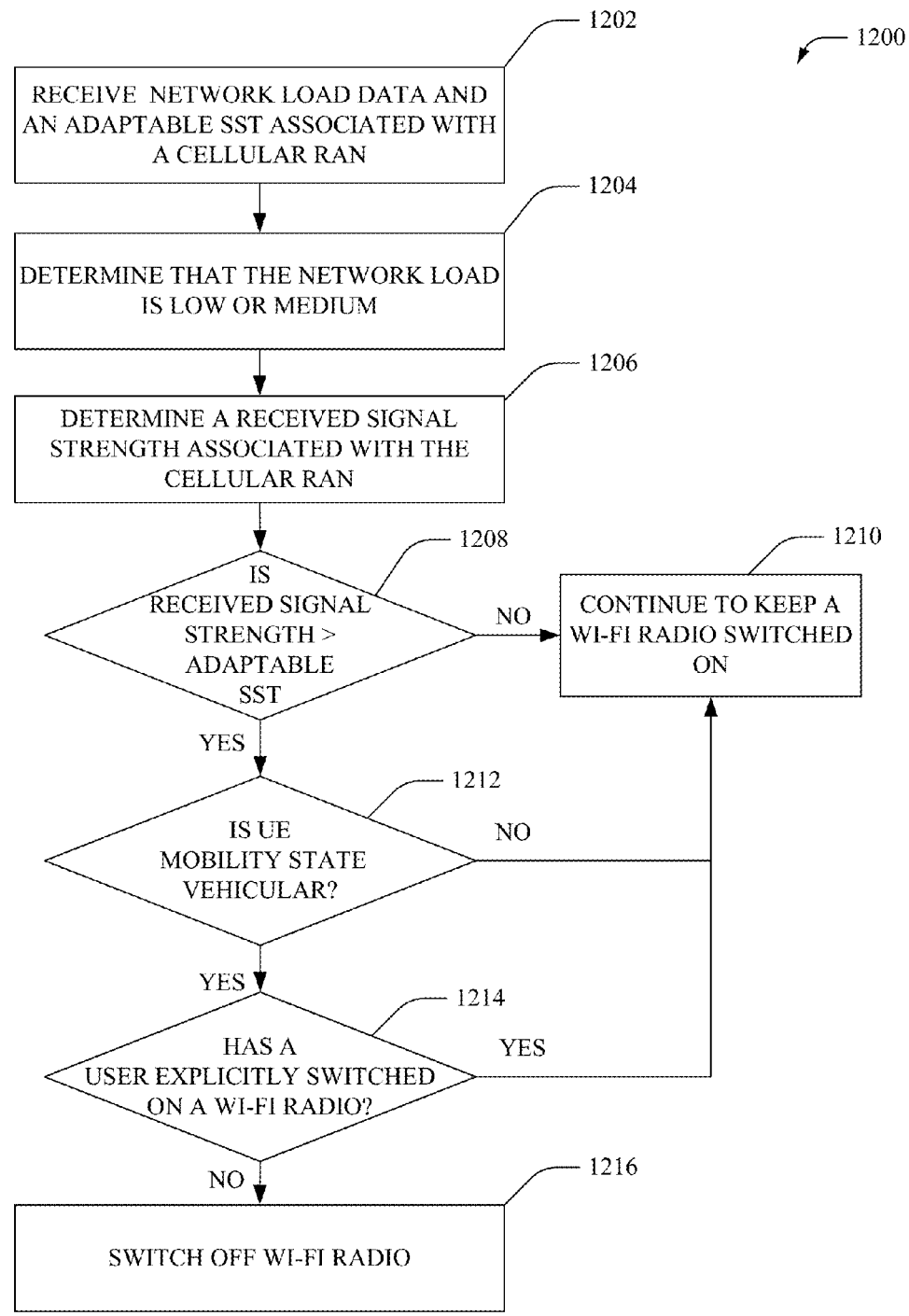
FIG. 12 illustrates an example method for determining whether a Wi-Fi radio of a UE is to be deactivated.

Referring now to FIG. 12, there illustrated is an example method 1200 for determining whether a Wi-Fi radio of a UE is to be deactivated, according to an aspect of the subject disclosure. As an example, method 1200 can be implemented by a UE to conserve battery power of the UE. It is noted that although methodology 1200 refers of a Wi-Fi radio, the subject specification is not that limited and that a radio associated with most any communication technology/protocol can be utilized. At 1202, network load data and an adaptable SST associated with a cellular RAN can be received, for example, by employing a cellular radio. As an example, the SST is adapted based on real time-network load and can be received via one or more cell broadcast messages (e.g., SIB messages). At 1204, it can be determined that the network load is low or medium. For example, the network load data can classify network congestion as "low" or "medium," or a percentage value representing the network load can be determined to be less than a defined load threshold.

At 1206, a received signal strength (e.g., RSRP, RSCP, RSSI, etc.) associated with the cellular RAN can be determined. Further, the received signal strength can be compared with the adaptable SST and at 1208; it can be determined whether the received signal strength is greater than the adaptable SST. If determined that the received signal strength is not greater than the adaptable SST then, at 1210, a Wi-Fi radio of the UE is kept switched on (or is activated). Further, if determined at 1208, that the received signal strength is less than the adaptable SST, then, at 1212, it can be determined whether the mobility state of the UE is vehicular. For example, the speed/motion of the UE can be compared with a defined speed/motion threshold/criterion. If determined that the UE is slow moving or the mobility state is not vehicular, then, at 1210, the Wi-Fi radio of the UE is kept switched on (or is activated). Furthermore, if determined at 1208, that the mobility state of the UE is vehicular, then, at 1214, it can be determined whether a user has explicitly switched on the Wi-Fi radio. If determined that the user has explicitly switched on the Wi-Fi radio at 1210, a Wi-Fi radio of the UE is kept switched on (or is activated). Alternatively, if determined that the user has not explicitly switched on the Wi-Fi radio, then at 1216, the Wi-Fi radio can be switched off to conserve UE battery. It is noted that various additional parameters such as (but not limited to) device preferences, application preferences, user defined policies, operator/service provider-defined policies, etc. can be employed to facilitate switching off the Wi-Fi radio.

Figure 13:
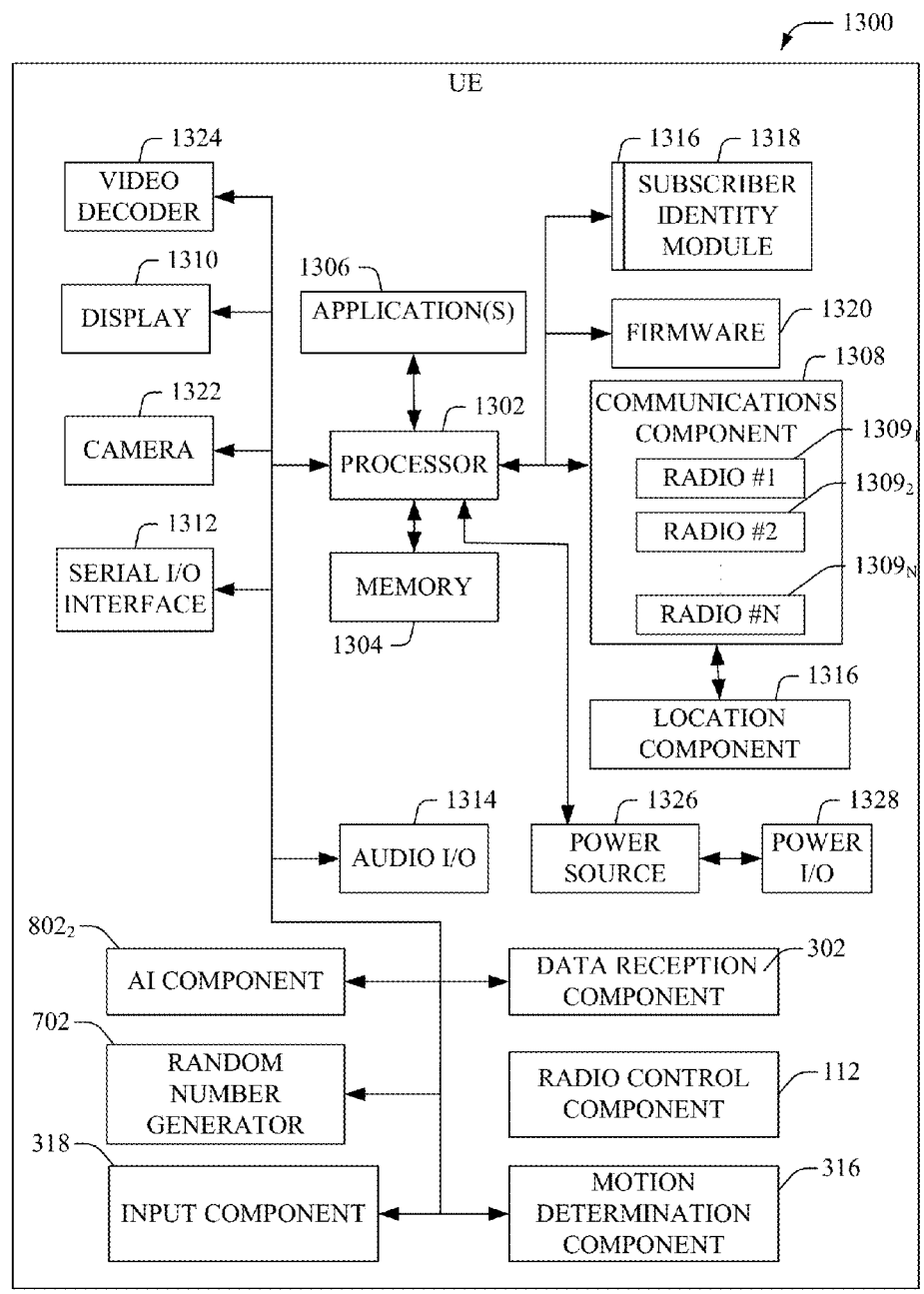
FIG. 13 illustrates an example block diagram of a user equipment suitable for radio control based on an adaptable signal strength criterion.

Referring now to FIG. 13, there is illustrated a block diagram of a UE 1300 that facilitates radio control based on an adaptable SS criterion in accordance with the subject specification. Moreover, the UE 1300 can be substantially similar to and include functionality associated with UE 102 described herein. In one aspect, the UE 1300 can include a processor 1302 for controlling all onboard operations and processes. A memory 1304 can interface to the processor 1302 for storage of data (e.g., including data retained in data store 304 and/or data store 602) and one or more applications 1306 being executed by the processor 1302. A communications component 1308 can interface to the processor 1302 to facilitate wired/wireless communication with external systems (e.g., via access point 104, target access point 110, communication network 204, etc.). According to an aspect, the communications component 1308 can include multiple radios radio#1-radio#N ($1309_1$-$1309_N$) (wherein, N is most any integer greater than 1), such as, but not limited to, WLAN radio, Wi-Fi radio, Bluetooth® radio, ZigBee® radio, etc. As an example, the radio#1-radio#N ($1309_1$-$1309_N$) can include circuitry (e.g., multiplexer/demultiplexer, modulator/demodulator, transceiver etc.) and/or antennae for communicating with respective RANs by employing respective RATs. The communications component 1308 can interface to a location component 1316 (e.g., GPS transceiver) that can facilitate location detection of the UE 1300.

The UE 1300 can include a display 1310 for displaying received content (and/or content to be transferred) and/or for displaying text information related to operating and using the device features. A serial I/O interface 1312 is provided in communication with the processor 1302 to facilitate serial communication (e.g., USB, and/or IEEE 1394) via a hardwire connection. Audio capabilities are provided with an audio I/O component 1314, which can include a speaker for the output of audio signals related to, for example, recorded data or telephony voice data, and a microphone for inputting voice signals for recording and/or telephone conversations.

Further, the UE 1300 can include a slot interface 1316 for accommodating a subscriber identity module (SIM) 1318. Firmware 1320 is also provided to store and provide to the processor 1302 startup and operational data. The UE 1300 can also include an image capture component 1322 such as a camera and/or a video decoder 1324 for decoding encoded multimedia content. Further, the UE 1300 can include a power source 1326 in the form of batteries, which power source 1326 interfaces to an external power system or charging equipment via a power I/O component 1328. In addition, the UE 1300 can include the radio control component 112, the data reception component 302, the motion determination component 316, the random number generator 702 and the AI component $802_2$, which can be stored in memory 1304 and/or implemented by an application 1306, can include respective functionality, as more fully described herein, for example, with regard to systems 100-800.

Figure 14:
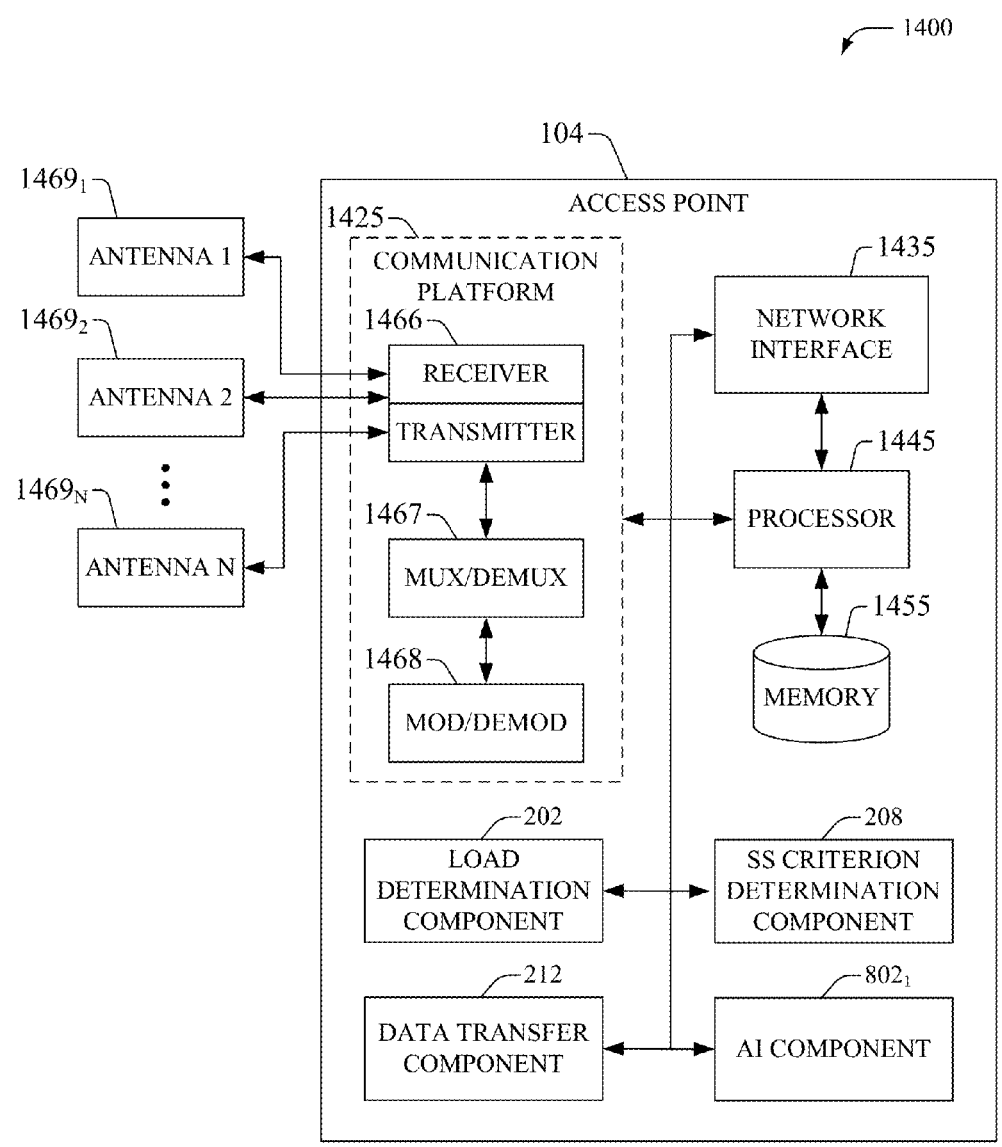
FIG. 14 illustrates an example block diagram of an access point suitable for automatic UE radio management based on an adaptable signal strength criterion.
Figure 15:
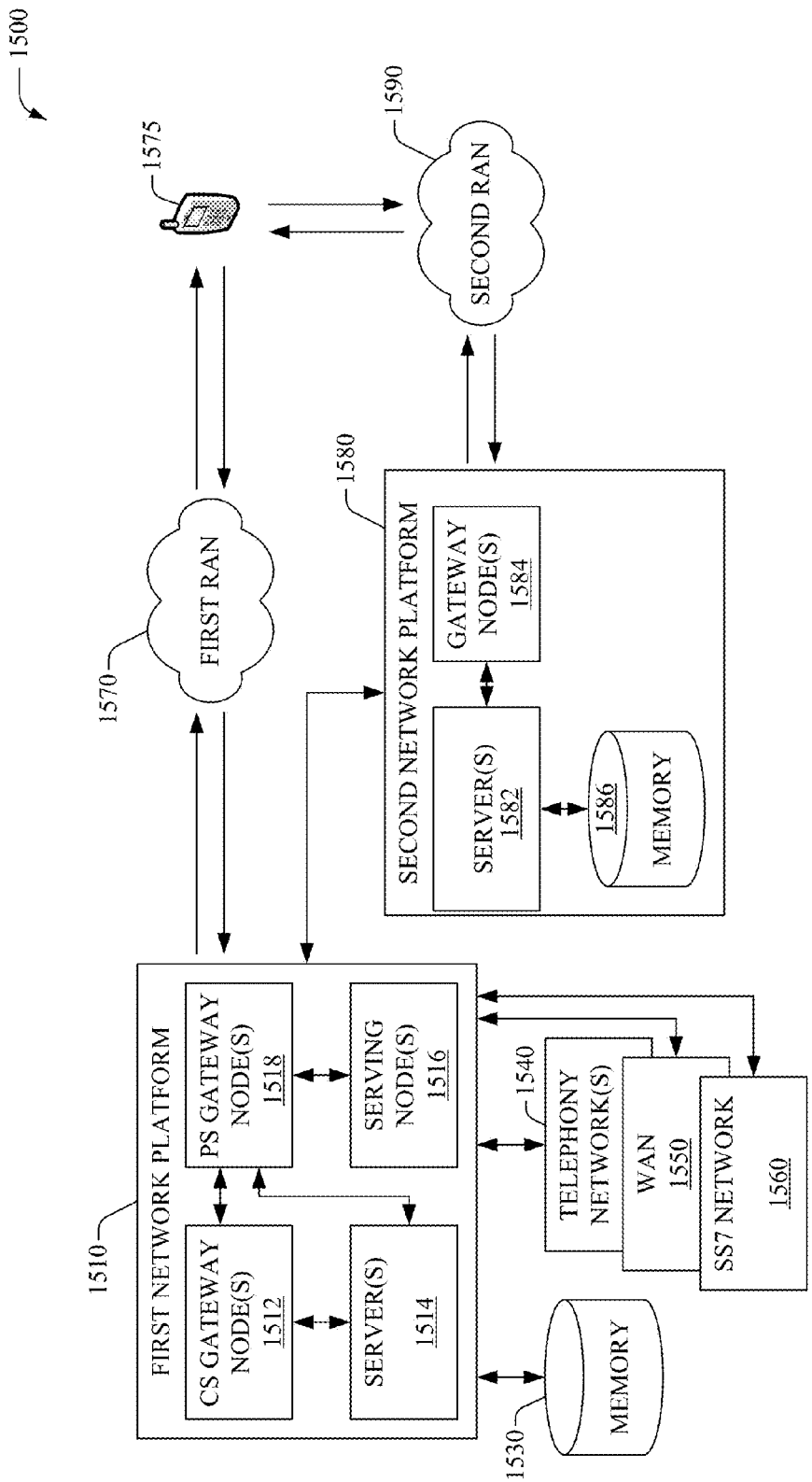
FIG. 15 illustrates an example wireless communication environment for UE power management based on an adaptable signal strength criterion.

To provide further context for various aspects of the subject specification, FIGS. 14 and 15 illustrate, respectively, a block diagram of an example embodiment 1400 of an access point that facilitates automatic UE radio management based on an adaptable SS criterion and a wireless communication environment 1500, with associated components for operation of efficient network selection in accordance with aspects described herein.

With respect to FIG. 14, in example embodiment 1400, access point 104 can receive and transmit signal(s) (e.g., traffic and control signals) from and to wireless devices, access terminals, wireless ports and routers, etc., through a set of antennas $1469_1$-$1469_N$. It should be appreciated that while antennas $1469_1$-$1469_N$ are a part of communication platform 1425, which comprises electronic components and associated circuitry that provides for processing and manipulating of received signal(s) (e.g., a packet flow) and signal(s) (e.g., a broadcast control channel) to be transmitted. In an aspect, communication platform 1425 can include a transmitter/receiver (e.g., a transceiver) 1466 that can convert signal(s) from analog format to digital format (e.g., analog-to-digital conversion) upon reception, and from digital format to analog (e.g., digital-to-analog conversion) format upon transmission. In addition, receiver/transmitter 1466 can divide a single data stream into multiple, parallel data streams, or perform the reciprocal operation. Coupled to transceiver 1466 is a multiplexer/demultiplexer 1467 that facilitates manipulation of signal in time and/or frequency space. Electronic component 1467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1467 can scramble and spread information (e.g., codes) according to substantially any code known in the art; e.g., Hadamard-Walsh codes, Baker codes, Kasami codes, polyphase codes, and so on. A modulator/demodulator 1468 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

Access point 104 also includes a processor 1445 configured to confer functionality, at least partially, to substantially any electronic component in the access point 104, in accordance with aspects of the subject disclosure. In particular, processor 1445 can facilitate implementing configuration instructions received through communication platform 1425, which can include storing data in memory 1455. In addition, processor 1445 facilitates processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1445 can manipulate antennas $1469_1$-$1469_N$ to facilitate beamforming or selective radiation pattern formation, which can benefit specific locations covered by the access point 104; and exploit substantially any other advantages associated with smart-antenna technology. Memory 1455 can store data structures, code instructions, system or device information like device identification codes (e.g., International Mobile Station Equipment Identity (IMEI), Mobile Station International Subscriber Directory Number (MSISDN), serial number . . . ) and specification such as multimode capabilities; code sequences for scrambling; spreading and pilot transmission, floor plan configuration, access point deployment and frequency plans; and so on. Moreover, memory 1455 can store configuration information such as schedules and policies; geographical indicator(s); network load data, SST data, historical logs, and so forth.

In embodiment 1400, processor 1445 can be coupled to the memory 1455 in order to store and retrieve information necessary to operate and/or confer functionality to communication platform 1425, network interface 1435 (e.g., that coupled the access point to core network devices such as but not limited to a network controller), and other operational components (e.g., multimode chipset(s), power supply sources . . . ; not shown) that support access point 104. The access point 104 can further include a load determination component 202, a SS criterion determination component 208, a data transfer component 212, and/or an AI component $802_1$, which can include functionality, as more fully described herein, for example, with regard to systems 100-500 and 700-800. In addition, it is to be noted that the various aspects disclosed in the subject specification can also be implemented through (i) program modules stored in a computer-readable storage medium or memory (e.g., memory 1455) and executed by a processor (e.g., processor 1445), or (ii) other combination(s) of hardware and software, or hardware and firmware.

Referring now to FIG. 15, there illustrated is a wireless communication environment 1500 that includes two wireless network platforms: (i) A first network platform 1510 (e.g., macro network platform) that serves, or facilitates communication with user equipment 1575 via a first RAN 1570. As an example, in cellular wireless technologies (e.g., 3GPP UMTS, HSPA, 3GPP LTE, 3GPP UMB, 4G LTE, etc.), the first network platform 1510 can be embodied in a Core Network; and (ii) A second network platform 1580 (e.g., WLAN platform), which can provide communication with UE 1575 through a second RAN 1590 linked to the second network platform 1580. It should be appreciated that the second network platform 1580 can offload UE 1575 from the first network platform 1510, once UE 1575 attaches (e.g., based on the traffic steering described herein) to the second RAN. In one example, the first RAN and the second RAN can be commonly operated and/or deployed by a common service provider.

It is noted that RAN (1570 and/or 1590) includes base station(s), or access point(s), and its associated electronic circuitry and deployment site(s), in addition to a wireless radio link operated in accordance with the base station(s). Accordingly, the first RAN 1570 can comprise various access points like access point 104, while the second RAN 1590 can comprise multiple access points like access point 110.

Both the first and the second network platforms 1510 and 1580 can include components, e.g., nodes, gateways, interfaces, servers, or platforms, that facilitate packet-switched (PS) and/or circuit-switched (CS) traffic (e.g., voice and data) and control generation for networked wireless communication. For example, the first network platform 1510 includes CS gateway node(s) 1512 which can interface CS traffic received from legacy networks like telephony network(s) 1540 (e.g., public switched telephone network (PSTN), or public land mobile network (PLMN)) or a SS7 network 1560. Moreover, CS gateway node(s) 1512 interfaces CS-based traffic and signaling and gateway node(s) 1518. In addition to receiving and processing CS-switched traffic and signaling, gateway node(s) 1518 can authorize and authenticate PS-based data sessions with served (e.g., through the first RAN 1570) wireless devices. Data sessions can include traffic exchange with networks external to the first network platform 1510, like wide area network(s) (WANs) 1550; it should be appreciated that local area network(s) (LANs) can also be interfaced with first network platform 1510 through gateway node(s) 1518. Gateway node(s) 1518 generates packet data contexts when a data session is established. It should be further appreciated that the packetized communication can include multiple flows that can be generated through server(s) 1514. The first network platform 1510 also includes serving node(s) 1516 that conveys the various packetized flows of information or data streams, received through gateway node(s) 1518. It is to be noted that server(s) 1514 can include one or more processors configured to confer at least in part the functionality of first network platform 1510. To that end, one or more processors can execute code instructions stored in memory 1530 or other computer-readable medium, for example.

In example wireless environment 1500, memory 1530 can store information related to operation of first network platform 1510. Information can include business data associated with subscribers; market plans and strategies, e.g., promotional campaigns, business partnerships; operational data for mobile devices served through first network platform; service and privacy policies; end-user service logs for law enforcement; and so forth. Memory 1530 can also store information from at least one of telephony network(s) 1540, WAN(s) 1550, or SS7 network 1560. Many different types of information can be stored in memory 1530 without departing from example embodiments.

Gateway node(s) 1584 can have substantially the same functionality as PS gateway node(s) 1518. Additionally or optionally, the gateway node(s) 1584 can also include substantially all functionality of serving node(s) 1516. In an aspect, the gateway node(s) 1584 can facilitate handover resolution, e.g., assessment and execution. Server(s) 1582 have substantially the same functionality as described in connection with server(s) 1514 and can include one or more processors configured to confer at least in part the functionality of the first network platform 1510. In one example, the network load management system 504 can be implemented or executed by server(s) 1582 and/or server(s) 1514. To that end, the one or more processor can execute code instructions stored in memory 1586, for example.

Memory 1586 can include information relevant to operation of the various components of the second network platform 1580. For example operational information that can be stored in memory 1586 can comprise, but is not limited to, subscriber information; contracted services; maintenance and service records; cell configuration (e.g., devices served through second RAN 1590; access control lists, or white lists); service policies and specifications; privacy policies; add-on features; and so forth.

Figure 16:
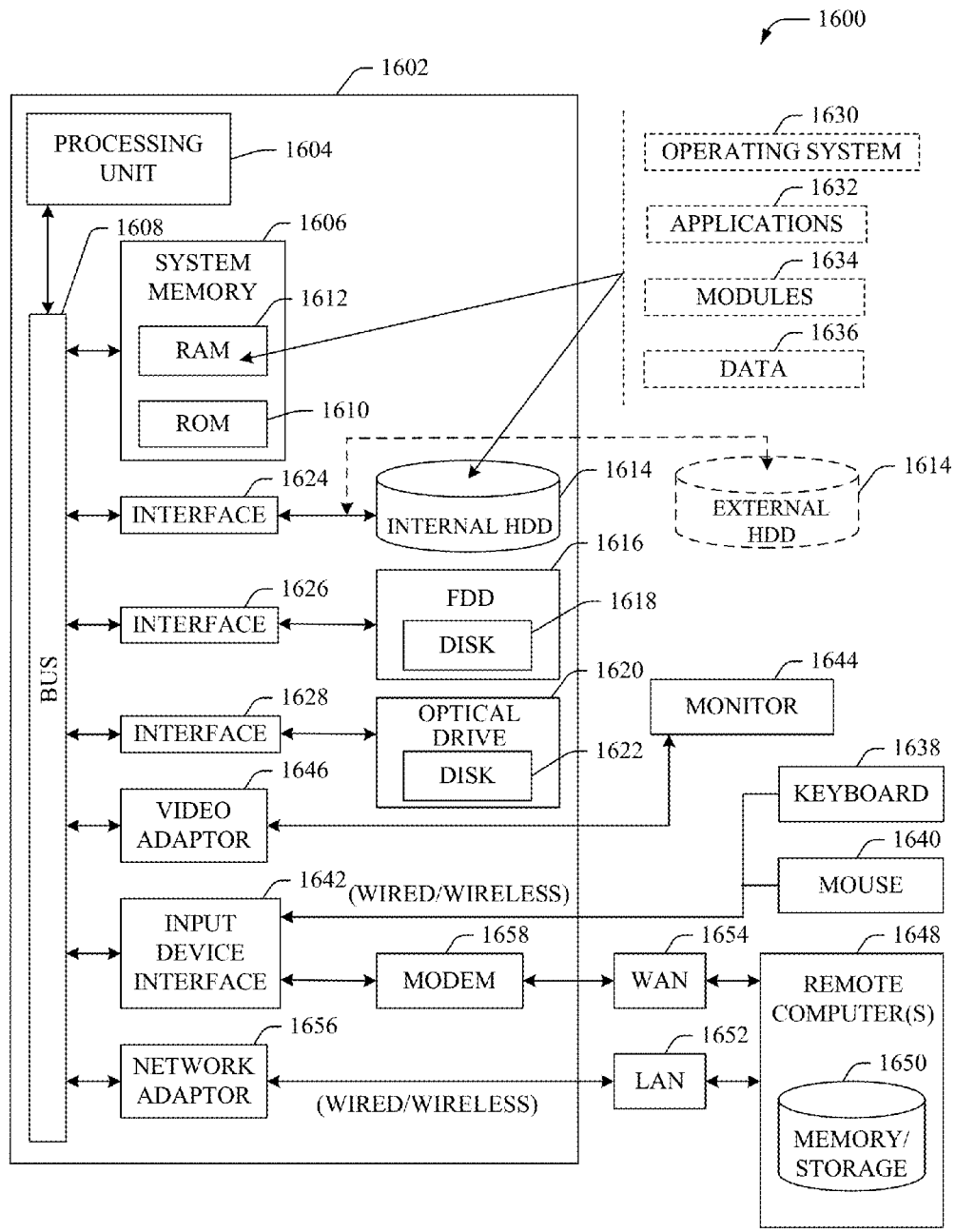
FIG. 16 illustrates a block diagram of a computer operable to execute the disclosed communication architecture.

Referring now to FIG. 16, there is illustrated a block diagram of a computer 1602 operable to execute the disclosed communication architecture. In order to provide additional context for various aspects of the disclosed subject matter, FIG. 16 and the following discussion are intended to provide a brief, general description of a suitable computing environment 1600 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various aspects of the specification includes a computer 1602, the computer 1602 including a processing unit 1604, a system memory 1606 and a system bus 1608. As an example, the component(s), server(s), equipment, system(s), and/or device(s) (e.g., user equipment 102, access point 104, target access point 110, radio control component 112, load determination component 202, SS criterion determination component 208, data transfer component 212, data reception component 302, access point 502, SS criterion determination component 506, random number generator 702, AI components $802_1$-$802_2$, etc.) disclosed herein with respect to system 100-800 can each include at least a portion of the computer 1602. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614, which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the specification can be implemented with various commercially available operating systems or combinations of operating systems.

A user can enter commands and information into the computer 1602 through one or more wired/wireless input devices, e.g., a keyboard 1638 and/or a pointing device, such as a mouse 1640 or a touchscreen or touchpad (not illustrated, but which may be integrated into UE 102 in some embodiments). These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc. A monitor 1644 or other type of display device is also connected to the system bus 1608 via an interface, such as a video adapter 1646.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 is connected to the local network 1652 through a wired and/or wireless communication network interface or adapter 1656. The adapter 1656 can facilitate wired or wireless communication to the LAN 1652, which can also include a wireless access point disposed thereon for communicating with the wireless adapter 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are example and other means of establishing a communications link between the computers can be used.

The computer 1602 is operable to communicate with any wireless devices or entities operatively disposed in wireless communication, e.g., desktop and/or portable computer, server, communications satellite, etc. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A user equipment, comprising:
   a processor; and
   a memory that stores executable instructions that, when executed by the processor, facilitate performance of operations, comprising:
   receiving a first signal representative of signal strength criterion data from a first network device of a first radio access network by employing a first radio of the user equipment, wherein the first signal is a data signal, and wherein the signal strength criterion data comprises a variable signal strength threshold that is modified based on a change in load data indicative of a load associated with the first radio access network,
   receiving, from the network device, classification data indicative of a type of radio access technology utilized by a second network device of a second radio access network, wherein the variable signal strength threshold has been modified based on the classification data, and
   based on comparing signal strength data, indicative of a strength of a second signal received from the first network device, with the variable signal strength threshold, controlling a power of a second radio of the user equipment that is employable to communicatively couple the user equipment with the second network device.

2. The user equipment of claim 1, wherein the controlling comprises switching on the second radio in response to determining that the strength of the second signal is less than the variable signal strength threshold.

3. The user equipment of claim 2, wherein the switching on the second radio comprises switching on the second radio in response to determining that load data received from the first network device satisfies a defined high load criterion.

4. The user equipment of claim 2, wherein the switching on the second radio comprises switching on the second radio in response to receiving input data instructing the user equipment to switch on the second radio.

5. The user equipment of claim 2, wherein the switching on the second radio comprises switching on the second radio in response to determining that motion data representing a motion of the user equipment satisfies a defined slow motion criterion.

6. The user equipment of claim 1, wherein the controlling comprises switching off the second radio in response to determining that the strength of the second signal is greater than the variable signal strength threshold.

7. The user equipment of claim 6, wherein the switching off the second radio comprises switching off the second radio in response to determining that the load data received from the first network device satisfies a defined low load criterion.

8. The user equipment of claim 1, wherein the variable signal strength threshold is a first variable signal strength threshold that is modified based on historical data indicative of a second variable signal strength threshold that has been utilized to increase network efficiency of the first network device.

9. The user equipment of claim 6, wherein the switching off the second radio comprises switching off the second radio in response to determining that motion data representing a motion of the user equipment satisfies a defined fast motion criterion.

10. The user equipment of claim 1, wherein the variable signal strength threshold is modified to steer traffic from selected user equipment, including the user equipment, to the second device.

11. The user equipment of claim 1, wherein the variable signal strength threshold is decreased in response to determining that congestion within the first radio access network has decreased.

12. The user equipment of claim 1, wherein the variable signal strength threshold is increased in response to determining that congestion within the first radio access network has increased.

13. A method, comprising:
receiving, by a user equipment comprising a processor, a data signal that represents signal strength criterion data from a first network device of a first radio access network by employing a first radio of the user equipment, wherein the signal strength criterion data represents an adaptable signal strength threshold that is determined based on load data indicative of a load associated with the first radio access network;
receiving, by the user equipment, category data indicative of a category of radio access technology utilized by a second network device of a second radio access network, wherein the adaptable signal strength threshold has been modified based on the category data, and
based on comparing signal strength data, representing a strength of a signal received from the first network device, with the adaptable signal strength threshold, denying, by the user equipment, a provision of power to a second radio of the user equipment that is employable to communicatively couple the user equipment with the second network device.

14. The method of claim 13, wherein the denying comprises denying the provision of the power to the second radio in response to determining that the strength of the signal is greater than the adaptable signal strength threshold.

15. The method of claim 13, wherein the denying comprises denying the provision of the power to the second radio based on speed data indicative of a speed of the user equipment.

16. The method of claim 13, wherein the denying comprises denying the provision of the power to the second radio based on load data indicative of congestion associated with the first radio access network.

17. The method of claim 13, wherein the denying comprises denying the provision of the power to the second radio based on policy data received via the first network device.

18. A non-transitory machine-readable storage medium comprising executable instructions that, when executed by a processor of a user equipment, facilitate the performance of operations, comprising:
receiving a data signal that represents congestion data associated with a first device of a first radio access network device, to which the user equipment is coupled via a first radio, wherein the congestion data is determined to satisfy a high congestion criterion;
receiving, from the first device, cell type data that specifies a radio access technology employed by a second device, of a second access network device, to which the user equipment can communicate via a second radio, wherein the congestion data has been adjusted based on the cell type data;
in response to verifying that location data indicative of a location of the user equipment satisfies a cell edge criterion, activating the second radio; and
in response to verifying that the location data does not satisfy the cell edge criterion, deactivating the second radio.

19. The non-transitory machine-readable storage medium of claim 18, wherein the data signal is a first signal, and wherein the verifying that location data satisfies a cell edge criterion is based on a comparison of the signal strength data associated with a second signal received from the first radio access network device with an adaptable signal strength criterion that is modified based on the congestion data.

20. The non-transitory machine-readable storage medium of claim 18, wherein the operations further comprise:
in response to determining that the congestion data has been updated and that the updated congestion data does not satisfy the high congestion criterion, deactivating the second radio.

* * * * *